United States Patent
Ballal et al.

(10) Patent No.: US 11,663,202 B2
(45) Date of Patent: May 30, 2023

(54) SECURE AND EFFICIENT DATABASE COMMAND EXECUTION SUPPORT

(71) Applicant: ThoughtSpot, Inc., Sunnyvale, CA (US)

(72) Inventors: Shrirang Ballal, Bangalore (IN); Ashok Anand, Bengaluru (IN); Kapil Khurana, Uttar Pradesh (IN); Tushar Marda, Jaipur (IN); Anand Kodaganur, Bangalore (IN)

(73) Assignee: ThoughtSpot, Inc., Mountain View, CA (US)

( * ) Notice: Subject to any disclaimer, the term of this patent is extended or adjusted under 35 U.S.C. 154(b) by 5 days.

(21) Appl. No.: 17/473,009

(22) Filed: Sep. 13, 2021

(65) Prior Publication Data

US 2023/0085163 A1    Mar. 16, 2023

(51) Int. Cl.
G06F 16/242    (2019.01)
G06F 16/23    (2019.01)
G06F 16/22    (2019.01)
G06F 16/21    (2019.01)
G06F 21/62    (2013.01)

(52) U.S. Cl.
CPC ........ G06F 16/2423 (2019.01); G06F 16/211 (2019.01); G06F 16/221 (2019.01); G06F 16/2365 (2019.01); G06F 21/6227 (2013.01)

(58) Field of Classification Search
CPC .. G06F 16/2423; G06F 16/211; G06F 16/221; G06F 16/2365
See application file for complete search history.

(56) References Cited

U.S. PATENT DOCUMENTS 7,734,648 B2 *    6/2010    Eberlein ............. G06F 16/2315
                                                  707/783
8,655,930 B2 *    2/2014    Beichter ............. G06F 16/2343
                                                  707/826

(Continued)

OTHER PUBLICATIONS

Thoughtspot, TQL Reference ThoughtSpot Software v6.3 Documentation, 16 pages, https://docs.thoughtspot.com/software/6.3/tql-cli-commands.

(Continued)

Primary Examiner — Dangelino N Gortayo
(74) Attorney, Agent, or Firm — Young Basile Hanlon & MacFarlane, P.C.

(57) ABSTRACT

Enabling auto-completion of database commands includes receiving, at a database command execution device from a client device, a request to execute a database command where the request includes a first indicator of a first set of tokens of the database that is available at the client device; executing the database command; transmitting, from the database command execution device to the client device, a response to the request that includes a status of the execution of the database command and a second indicator of a second set of tokens of the database that is different from the first set of tokens; receiving, at the database command execution device and from the client device, an update-tokens request that includes the first indicator; and transmitting, from the database command execution device and to the client device, data indicative of differences between the second set of tokens and the first set of tokens.

20 Claims, 10 Drawing Sheets

(56) References Cited

U.S. PATENT DOCUMENTS

| | | | | |
|---|---|---|---|---|
| 9,830,353 | B1* | 11/2017 | Dalmia | G06F 16/2453 |
| 10,185,737 | B2* | 1/2019 | Renkes | G06F 16/35 |
| 2020/0034373 | A1* | 1/2020 | Lee | G06F 16/2365 |
| 2022/0107802 | A1* | 4/2022 | Rao | G06F 16/907 |
| 2022/0245165 | A1* | 8/2022 | Johnston | G06F 40/30 |

OTHER PUBLICATIONS

Thoughtspot, tsload connector reference, ThoughtSpot Software v6.3 Documentation, 15 pages, https://docs.thoughtspot.com/software/6.3/tsload-api.

Thoughtspot, TQL service reference, ThoughtSpot Software v6.3 Documentation, 15 pages, https://docs.thoughtspot.com/software/6.3/tql-service-api-ref.

* cited by examiner

US 11,663,202 B2

SECURE AND EFFICIENT DATABASE COMMAND EXECUTION SUPPORT

BACKGROUND

Advances in computer storage and database technology have led to exponential growth of the amount of data being created. Businesses are overwhelmed by the volume of the data stored in their computer systems. Existing database analytic tools are inefficient, costly to utilize, and/or require substantial configuration and training.

SUMMARY

Disclosed herein are implementations of secure and efficient database command execution support.

A first aspect is a method for enabling auto-completion of database commands. The method includes receiving, at a database command execution device and from a client device, a request to execute a database command where the request includes a first indicator of a first set of tokens of the database that is available at the client device; executing the database command; transmitting, from the database command execution device and to the client device, a response to the request. The response includes a status of the execution of the database command and a second indicator of a second set of tokens of the database that is different from the first set of tokens. The method also includes receiving, at the database command execution device and from the client device, an update-tokens request that includes the first indicator; and transmitting, from the database command execution device and to the client device, data indicative of differences between the second set of tokens and the first set of tokens.

A second aspect is a device for providing auto-completion of database commands. The device includes a memory and a processor. The processor is configured to execute instructions stored in the memory to transmit, to a database command execution device, a request to execute a database command, where the request includes a first indicator of a first set of tokens of the database that is available at the device; receive, from the database command execution device, a response to the request that includes a status of executing the database command and a second indicator of a second set of tokens of the database that is different from the first set of tokens; responsive to the second indicator, transmit, to the database command execution device, an update-tokens request that includes the first indicator; receive, from the database command execution device, data indicative of differences between the second set of tokens and the first set of tokens; update the first set of tokens according to the data indicative of differences between the second set of tokens and the first set of tokens; and, responsive to a user request received from a user to auto-complete a token of a second database command, display to the user a list of matching tokens from the first set of tokens.

A third aspect is a schema-aware database interface that includes a client device including a processor and a memory. The memory includes instructions configured to generate a first database command based on first user input obtained using a first token set representative of at least a portion of a database schema, where the first token set is restricted to tokens for which a user of the client device is authorized to access and associated with a first version; receive, responsive to sending the first database command to a server, (a) a result from executing the first database command and (b) a current version representative of a current state of the database schema; responsive to a determination that the current version is newer than the first version, obtain, from the server, update to the first token set to obtain an updated first token set; and obtain second user input using the updated first token set.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
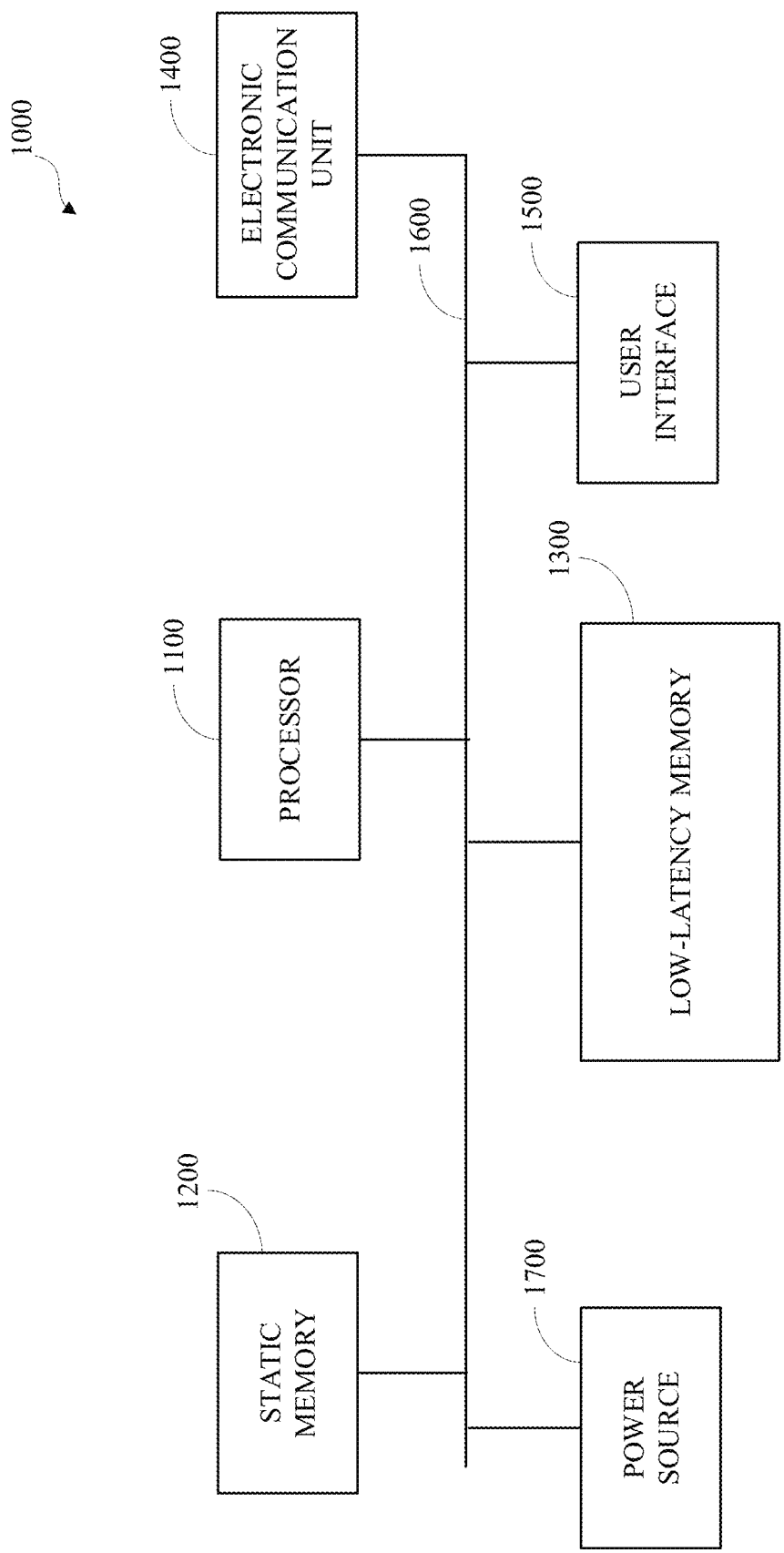
FIG. 1 is a block diagram of an example of a computing device.

Businesses and other organizations store large amounts of data, such as business records, transaction records, and the like, in data storage systems, such as relational database systems that store data as records, or rows, having values, or fields, corresponding to respective columns in tables that can be interrelated using key values. Databases structures are often normalized or otherwise organized to maximize data density and to maximize transactional data operations at the expense of increased complexity and reduced accessibility for analysis. Individual records and tables may have little or no utility without substantial correlation, interpretation, and analysis. The complexity of these data structures and the large volumes of data that can be stored therein limit the accessibility of the data and require substantial skilled human resources to code procedures and tools that allow business users to access useful data. The tools that are available for accessing these systems are limited to outputting data expressly requested by the users and lack the capability to identify and prioritize data other than the data expressly requested. Useful data, such as data aggregations, patterns, and statistical anomalies that would not be available in smaller data sets (e.g., 10,000 rows of data), and may not be apparent to human users, may be derivable using the large volume of data (e.g., millions or billions of rows) stored in complex data storage systems, such as relational database systems, and may be inaccessible due to the complexity and limitations of the data storage systems.

A database system, such as a distributed in-memory database described herein, may provide an interactive facility (e.g., tool, mechanism, software, or the like, whether graphical-user-interface based, command-line-interface based, or otherwise) that administrators can use to issue database commands (e.g., statements, directives, instructions, etc.) to the database system. The database commands can include data manipulation commands, data definition commands, database query commands, or other types of database commands. Data manipulation commands can be used, for example, to modify existing data of the database, add (e.g., insert, load, etc.) new data into the database, or delete data from the database. Data definition commands can be used, for example, to create, modify, or delete database objects (e.g., ontological data or schema data that are a type/subset of ontological data), such as data that describes one or more aspects of the attributes, rows, columns, tables, relationships, indices, or other aspects of the data or the database. While the disclosure herein may use the term database system, the teachings herein can be used with any data source that may function as or provide services similar to a database system. Thus, unless otherwise clear from the context, the terms database system and data source may be used interchangeably.

Traditionally, such interactive facilities may be built on an assumption that the administrator using the interactive facility may be authorized to manipulate (e.g., access, modify, or add to) all schema data of the database system. This assumption may lead to user frustration, may waste computation and network resources, and may degrade the performance of the database system for other users. To illustrate, the administrator may sequentially issue several database commands that include tokens (e.g., names of tables or columns) representing ontological objects of the database system that the administrator is, in fact, not authorized to access. For each of the database commands, the database system receives the command, processes the command, determines that the administrator is not authorized to perform the command, and returns an authorization failure status of the command.

The possibility for degraded performance and increased usage of the computational and network resources may also include substantially increased investment in processing, memory, and storage resources and may also result in increased energy expenditures (needed to operate those increased processing, memory, and storage resources, and for the network transmission of the database commands) and associated emissions that may result from the generation of that energy.

Contrastingly, database command execution using a command execution facility according to this disclosure can aid the user (who may not necessarily be an administrator of the database system) formulate and perform database commands consistent with (e.g., according to, etc.) the authorization (e.g., access controls) of the user to the ontological (e.g., schema) information of the database system therewith minimizing database command execution failures due to lack of access controls of the user and preserving computational and network resources.

Traditional interactive facilities may also be built on the assumption that the user executing database commands is familiar with databases and/or the schemas of the databases of the database system and/or with the syntax of (e.g., grammars defining, etc.) database commands. For example, traditional interactive facilities may be built on the assumption that the user is familiar with (e.g., knows or knows of) the ontological tokens (e.g., table names, column names, etc.), control-word tokens, or other types of tokens necessary for formulating (e.g., composing, etc.) the database commands. However, the database system may include many databases, the schema of each of the databases may include many (e.g., 10s, 100s, or more) tables and many (e.g., 100s, 1000s, or more) columns. It may not be reasonable to assume that the user has sufficient knowledge of ontological tokens, such as tokens representing the database names, the table names, and/or the column names available in the database system.

A user who is not sufficiently familiar with the ontological tokens of a database system may resort to trial-and-error in formulating database commands at least some of which may be processed and rejected by the database system therewith also leading to user frustration, a waste of computation and network resources, and a degraded performance of the database system for other users. Additionally, a user who may not be sufficiently familiar with the control-word tokens of the database system may formulate database commands that result in, for example, syntax errors therewith also leading to user frustration, a waste of computation and network resources, and a degraded performance of the database system for other users.

Contrastingly, database command execution using a command execution facility according to this disclosure can aid the user formulate and perform database commands that are consistent with the ontological information (e.g., the schema) of the database system therewith minimizing database command execution failures due to the use of incorrect tokens (e.g., tokens that do not represent, describe, or indicate the ontological data) by the user. For example, the command execution facility may provide auto-completion of tokens so that the user can quickly formulate valid database commands (e.g., database commands that are consistent with the ontological information and the grammar(s) of the database system). Additionally, using auto-completion, a user unfamiliar with the schema of the database system can quickly discover the schema and use the database system. Auto-completion can be defined as a function of the command execution facility that gives a user the option of completing tokens via a shorthand method (such as by entering a special key combination) on the basis of what the user has already typed and, in the case of multiple possible completions, gives the user a list of the possible completions for the user to choose from. Choosing one of the possible completions encompasses providing (e.g., typing, selecting, etc.) the one of the possible completions. As such, the command execution facility is said to be or to provide a schema-aware database interface.

To illustrate, the tokens can include the control-word tokens CREATE, TABLE, SCHEMA, SELECT, FROM, and WHERE of the database system. The grammar of the database system may be such that the control-word token CREATE can be followed by either the control-word token TABLE or the control-word token SCHEMA. The user may enter the token CREATE and enter a special key combination that indicates to the command execution facility to perform auto-completion. Responsive to receiving the special key combination, the command execution facility may present the tokens TABLE and SCHEMA to the user and the user can select one of the TABLE or CREATE tokens. In another illustration, assume that a database includes the table named EMPLOYEE, which includes the columns named ID, FIRST_NAME, LAST_NAME, STREET, CITY, STATE, OFFICE_LOCATION, ORGANIZATION, and OFFICE_PHONE. As such, responsive to a user request, such as the user entering the special key combination after typing "SELECT FROM EMPLOYEE O*", where the * is a wildcard character, the command execution facility can present to the user the ontological tokens OFFICE_LOCATION, ORGANIZATION, and OFFICE_PHONE, which are tokens of the database system that start with the letter O.

The user may use the command execution facility to execute multiple database commands in a user session. A user session may be defined as a duration of use of the command execution facility from the time that the user authenticates with (e.g., logs in to) the command execution facility until the user exists (e.g., logs out of or is logged out of) the command execution facility. The ontological information of the database that the user can use may change (such as by some other user) during the user session. That the ontological information that the user can use is changed can mean that the schema of the database is changed, that the authorization of the user to the schema information has changed, or both. The command execution facility can maintain (e.g., include, store, cache, retrieve, etc.) the latest schema information throughout the user session therewith enabling the user to formulate valid database commands (e.g., commands that are consistent with the ontological information) even as the ontological information changes throughout the user session.

A command execution facility according to this disclosure can include a client portion and a server portion. The client portion and the server portion may securely communicate. For example, the client portion and the server portion may communicate using the Hypertext Transfer Protocol Secure (HTTPS), using Transport Layer Security (TLS), or using some other secure communication mechanism. The user interacts with the client portion to enter database commands. The client portion includes a set of tokens of the database system, which the client portion obtains from the server portion. The set of tokens reflects (i.e., is consistent with, is obtained from, etc.) the latest schema (e.g., ontological) information of the database system and the latest authorization information of the user to the schema information. The client portion uses the set of tokens to aid the user in formulating database commands that are likely to be accepted (e.g., successfully executed) by the server portion. As such, the command execution facility can be secure and efficient database.

A distributed in-memory ontology unit of the database system may associate a version level (e.g., a schema level) with the ontological information. The set of tokens obtained from the server portion can be associated with, or reflect, a schema level, which the server portion transmits to the client portion. A change to the schema of a database may result in a change (e.g., an increase) to the schema level. The server portion obtains from the database system (e.g., such as via polling, subscription, or some other mechanism) notifications of changes to the ontological information, such as changes to the schema information. Responsive to determining (e.g., identifying, being notified, etc.) that the schema level at the server portion (i.e., server-schema level) is different from the schema level at the client portion (i.e., client-schema level), the client portion issues a update-tokens request to the server portion to obtain tokens reflective of the latest schema level of the server portion.

Similarly, a semantic interface unit of the database system may associate a user authorization level with the ontology information. The user authorization level reflects (e.g., determines, identifies, etc.) the ontological information and/or the data of the database that the user can access. As such, the set of tokens obtained from the server portion can be associated with an authorization level, which the server portion transmits to the client portion. A change to the authorization (e.g., access controls) of a database may result in an increase to the authorization level. The server portion obtains from the database system (e.g., such as via polling, subscription, or some other mechanism) notifications of changes to the authorization level, such as changes to the access controls. Responsive to determining (e.g., identifying) that the authorization level at the server portion (i.e., server-authorization level) is different from the authorization level at the client portion (client-authorization level), the client portion issues an update-tokens request to the server portion to obtain tokens reflective of the latest authorization level of the server portion.

According to implementations of this disclosure, the client portion transmits database commands to the server portion, which may or may cause a component of the database system to perform the database commands. The client portion transmits requests to the server portion to execute database commands entered by the user at the client portion. The client portion includes, in a transmitted request, an indication of a first set of tokens of the database that is available at the client portion. The indication of the first set of tokens can be or include the client-schema level, the client-authorization level, or both associated with the first set of tokens.

In the response to the request, and in addition to a result of the execution of the database command by the database system, the server portion may include an indication of a second set of tokens of the database that is available at the server portion. The indication of the second set of tokens can indicate a different schema level, a different authorization level, or both, than those transmitted by the client portion. That is, the server portion may inform the client portion that the set of tokens available at the client portion are out date because the set of tokens is not reflective of the latest schema level, the authorization level of the database system, or both. Responsive to receiving the indication from the server portion, the client portion can issue an update-schema request to the server portion so that the client portion can be updated with the latest schema tokens reflective of the latest schema and the latest access control information. As such, the dynamic tokens are not bound (e.g., fixed, unchangeable, etc.) in a session. Rather the set of dynamic tokens at the client portion can evolve (e.g., are updated, etc.) as the user issues database commands to the server portion.

Additionally, the set of dynamic tokens transmitted to the client portion can be limited to those tokens that are currently likely to be used by the user of the client portion. For example, the user may indicate the database of the database system that the user intends to issue database commands to. The client portion can transmit the database name in requests (e.g., in every request) to the server portion so that the server portion can determine whether the set of dynamic tokens at the client portion for the database are our of date. The server portion transmit only tokens of the database to the client portion.

In some implementations, the client portion can (such as at regular intervals) poll (e.g., query, etc.) the server portion for updated tokens. The client portion can send requests, which include the client-schema level, the client-authorization level, or both to the server portion and the server portion responds with the latest dynamic token changes (if any). As such, even if a session is open for a long time without transmitting database commands to the server portion, any token changes corresponding to schema and/or authorization updates at the data source can be incorporated in the set of tokens available at the client portion.

As becomes obvious from the disclosure herein, a command execution facility according to this disclosure can provide several benefits including, but not limited to, intelligent token passing for enabling an auto-complete feature by retaining, at the client portion, a minimal number of tokens, limiting access to the tokens of authorized objects, and updating dynamic tokens in cases of schema or authorization changes; and efficiently passing large results from the server portion to the client portion.

FIG. 1 is a block diagram of an example of a computing device 1000. One or more aspects of this disclosure may be implemented using the computing device 1000. The computing device 1000 includes a processor 1100, static memory 1200, low-latency memory 1300, an electronic communication unit 1400, a user interface 1500, a bus 1600, and a power source 1700. Although shown as a single unit, any one or more element of the computing device 1000 may be integrated into any number of separate physical units. For example, the low-latency memory 1300 and the processor 1100 may be integrated in a first physical unit and the user interface 1500 may be integrated in a second physical unit. Although not shown in FIG. 1, the computing device 1000 may include other aspects, such as an enclosure or one or more sensors.

The computing device 1000 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC.

The processor 1100 may include any device or combination of devices capable of manipulating or processing a signal or other information, including optical processors, quantum processors, molecular processors, or a combination thereof. The processor 1100 may be a central processing unit (CPU), such as a microprocessor, and may include one or more processing units, which may respectively include one or more processing cores. The processor 1100 may include multiple interconnected processors. For example, the multiple processors may be hardwired or networked, including wirelessly networked. In some implementations, the operations of the processor 1100 may be distributed across multiple physical devices or units that may be coupled directly or across a network. In some implementations, the processor 1100 may include a cache, or cache memory, for internal storage of operating data or instructions. The processor 1100 may include one or more special purpose processors, one or more digital signal processor (DSP), one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, firmware, one or more state machines, or any combination thereof.

The processor 1100 may be operatively coupled with the static memory 1200, the low-latency memory 1300, the electronic communication unit 1400, the user interface 1500, the bus 1600, the power source 1700, or any combination thereof. The processor may execute, which may include controlling, such as by sending electronic signals to, receiving electronic signals from, or both, the static memory 1200, the low-latency memory 1300, the electronic communication unit 1400, the user interface 1500, the bus 1600, the power source 1700, or any combination thereof to execute, instructions, programs, code, applications, or the like, which may include executing one or more aspects of an operating system, and which may include executing one or more instructions to perform one or more aspects described herein, alone or in combination with one or more other processors.

The static memory 1200 is coupled to the processor 1100 via the bus 1600 and may include non-volatile memory, such as a disk drive, or any form of non-volatile memory capable of persistent electronic information storage, such as in the absence of an active power supply. Although shown as a single block in FIG. 1, the static memory 1200 may be implemented as multiple logical or physical units.

The static memory 1200 may store executable instructions or data, such as application data, an operating system, or a combination thereof, for access by the processor 1100. The executable instructions may be organized into programmable modules or algorithms, functional programs, codes, code segments, or combinations thereof to perform one or more aspects, features, or elements described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer.

The low-latency memory 1300 is coupled to the processor 1100 via the bus 1600 and may include any storage medium with low-latency data access including, for example, DRAM modules such as DDR SDRAM, Phase-Change Memory (PCM), flash memory, or a solid-state drive. Although shown as a single block in FIG. 1, the low-latency memory 1300 may be implemented as multiple logical or physical units. Other configurations may be used. For example, low-latency memory 1300, or a portion thereof, and processor 1100 may be combined, such as by using a system on a chip design.

The low-latency memory 1300 may store executable instructions or data, such as application data for low-latency access by the processor 1100. The executable instructions may include, for example, one or more application programs, that may be executed by the processor 1100. The executable instructions may be organized into programmable modules or algorithms, functional programs, codes, code segments, and/or combinations thereof to perform various functions described herein.

The low-latency memory 1300 may be used to store data that is analyzed or processed using the systems or methods described herein. For example, storage of some or all data in low-latency memory 1300 instead of static memory 1200 may improve the execution speed of the systems and methods described herein by permitting access to data more quickly by an order of magnitude or greater (e.g., nanoseconds instead of microseconds).

The electronic communication unit 1400 is coupled to the processor 1100 via the bus 1600. The electronic communication unit 1400 may include one or more transceivers. The electronic communication unit 1400 may, for example, provide a connection or link to a network via a network interface. The network interface may be a wired network interface, such as Ethernet, or a wireless network interface. For example, the computing device 1000 may communicate with other devices via the electronic communication unit 1400 and the network interface using one or more network protocols, such as Ethernet, Transmission Control Protocol/Internet Protocol (TCP/IP), power line communication (PLC), Wi-Fi, infrared, ultra violet (UV), visible light, fiber optic, wire line, general packet radio service (GPRS), Global System for Mobile communications (GSM), code-division multiple access (CDMA), Long-Term Evolution (LTE), or other suitable protocols.

The user interface 1500 may include any unit capable of interfacing with a human user, such as a virtual or physical keypad, a touchpad, a display, a touch display, a speaker, a microphone, a video camera, a sensor, a printer, or any combination thereof. For example, a keypad can convert physical input of force applied to a key to an electrical signal that can be interpreted by computing device 1000. In another example, a display can convert electrical signals output by computing device 1000 to light. The purpose of such devices may be to permit interaction with a human user, for example by accepting input from the human user and providing output back to the human user. The user interface 1500 may include a display; a positional input device, such as a mouse, touchpad, touchscreen, or the like; a keyboard; or any other human and machine interface device. The user interface 1500 may be coupled to the processor 1100 via the bus 1600. In some implementations, the user interface 1500 can include a display, which can be a liquid crystal display (LCD), a cathode-ray tube (CRT), a light emitting diode (LED) display, an organic light emitting diode (OLED) display, an active matrix organic light emitting diode (AMO-LED), or other suitable display. In some implementations, the user interface 1500, or a portion thereof, may be part of another computing device (not shown). For example, a physical user interface, or a portion thereof, may be omitted from the computing device 1000 and a remote or virtual interface may be used, such as via the electronic communication unit 1400.

The bus 1600 is coupled to the static memory 1200, the low-latency memory 1300, the electronic communication unit 1400, the user interface 1500, and the power source 1700. Although a single bus is shown in FIG. 1, the bus 1600 may include multiple buses, which may be connected, such as via bridges, controllers, or adapters.

The power source 1700 provides energy to operate the computing device 1000. The power source 1700 may be a general-purpose alternating-current (AC) electric power supply, or power supply interface, such as an interface to a household power source. In some implementations, the power source 1700 may be a single use battery or a rechargeable battery to allow the computing device 1000 to operate independently of an external power distribution system. For example, the power source 1700 may include a wired power source; one or more dry cell batteries, such as nickel-cadmium (NiCad), nickel-zinc (NiZn), nickel metal hydride (NiMH), lithium-ion (Li-ion); solar cells; fuel cells; or any other device capable of powering the computing device 1000.

Figure 2:
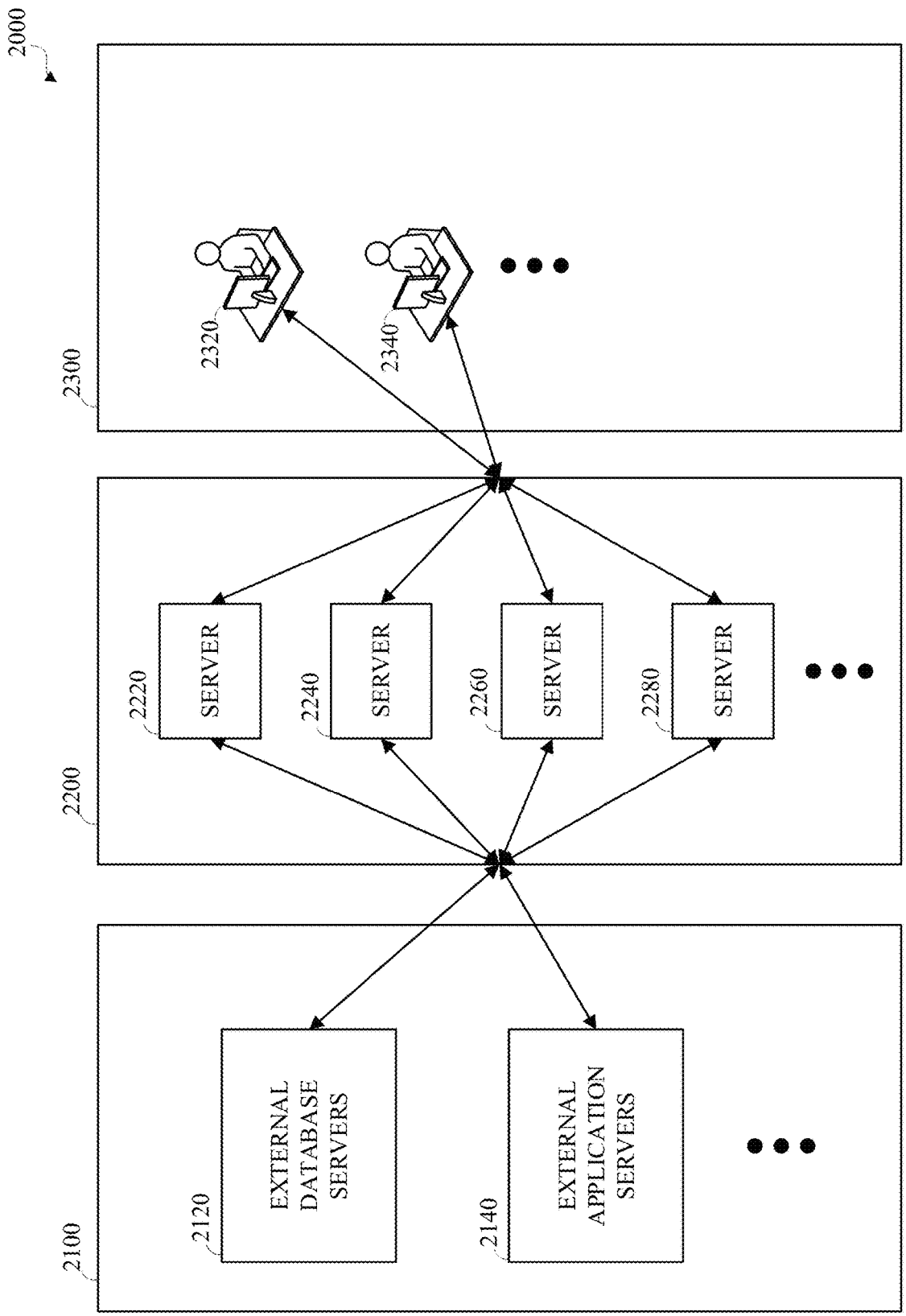
FIG. 2 is a block diagram of an example of a computing system.

FIG. 2 is a block diagram of an example of a computing system 2000. As shown, the computing system 2000 includes an external data source portion 2100, an internal database analysis portion 2200, and a system interface portion 2300. The computing system 2000 may include other elements not shown in FIG. 2, such as computer network elements.

The external data source portion 2100 may be associated with, such as controlled by, an external person, entity, or organization (second-party). The internal database analysis portion 2200 may be associated with, such as created by or controlled by, a person, entity, or organization (first-party). The system interface portion 2300 may be associated with, such as created by or controlled by, the first-party and may be accessed by the first-party, the second-party, third-parties, or a combination thereof, such as in accordance with access and authorization permissions and procedures.

The external data source portion 2100 is shown as including external database servers 2120 and external application servers 2140. The external data source portion 2100 may include other elements not shown in FIG. 2. The external data source portion 2100 may include external computing devices, such as the computing device 1000 shown in FIG. 1, which may be used by or accessible to the external person, entity, or organization (second-party) associated with the external data source portion 2100, including but not limited to external database servers 2120 and external application servers 2140. The external computing devices may include data regarding the operation of the external person, entity, or organization (second-party) associated with the external data source portion 2100.

The external database servers 2120 may be one or more computing devices configured to store data in a format and schema determined externally from the internal database analysis portion 2200, such as by a second-party associated with the external data source portion 2100, or a third party. For example, the external database server 2120 may use a relational database and may include a database catalog with a schema. In some embodiments, the external database server 2120 may include a non-database data storage structure, such as a text-based data structure, such as a comma separated variable structure or an extensible markup language formatted structure or file. For example, the external database servers 2120 can include data regarding the production of materials by the external person, entity, or organization (second-party) associated with the external data source portion 2100, communications between the external person, entity, or organization (second-party) associated with the external data source portion 2100 and third parties, or a combination thereof. Other data may be included. The external database may be a structured database system, such as a relational database operating in a relational database management system (RDBMS), which may be an enterprise database. In some embodiments, the external database may be an unstructured data source. The external data may include data or content, such as sales data, revenue data, profit data, tax data, shipping data, safety data, sports data, health data, weather data, or the like, or any other data, or combination of data, that may be generated by or associated with a user, an organization, or an enterprise and stored in a database system. For simplicity and clarity, data stored in or received from the external data source portion 2100 may be referred to herein as enterprise data.

The external application server 2140 may include application software, such as application software used by the external person, entity, or organization (second-party) associated with the external data source portion 2100. The external application server 2140 may include data or metadata relating to the application software.

The external database servers 2120, the external application servers 2140, or both, shown in FIG. 2 may represent logical units or devices that may be implemented on one or more physical units or devices, which may be controlled or operated by the first party, the second party, or a third party.

The external data source portion 2100, or aspects thereof, such as the external database servers 2120, the external application servers 2140, or both, may communicate with the internal database analysis portion 2200, or an aspect thereof, such as one or more of the servers 2220, 2240, 2260, and 2280, via an electronic communication medium, which may be a wired or wireless electronic communication medium. For example, the electronic communication medium may include a local area network (LAN), a wide area network (WAN), a fiber channel network, the Internet, or a combination thereof.

The internal database analysis portion 2200 is shown as including servers 2220, 2240, 2260, and 2280. The servers 2220, 2240, 2260, and 2280 may be computing devices, such as the computing device 1000 shown in FIG. 1. Although four servers 2220, 2240, 2260, and 2280 are shown in FIG. 2, other numbers, or cardinalities, of servers may be used. For example, the number of computing devices may be determined based on the capability of individual computing devices, the amount of data to be processed, the complexity of the data to be processed, or a combination thereof. Other metrics may be used for determining the number of computing devices.

The internal database analysis portion 2200 may store data, process data, or store and process data. The internal database analysis portion 2200 may include a distributed cluster (not expressly shown) which may include two or more of the servers 2220, 2240, 2260, and 2280. The operation of distributed cluster, such as the operation of the servers 2220, 2240, 2260, and 2280 individually, in combination, or both, may be managed by a distributed cluster manager. For example, the server 2220 may be the distributed cluster manager. In another example, the distributed cluster manager may be implemented on another computing device (not shown). The data and processing of the distributed cluster may be distributed among the servers 2220, 2240, 2260, and 2280, such as by the distributed cluster manager.

Enterprise data from the external data source portion 2100, such as from the external database server 2120, the external application server 2140, or both may be imported into the internal database analysis portion 2200. The external database server 2120, the external application server 2140, or both may be one or more computing devices and may communicate with the internal database analysis portion 2200 via electronic communication. The imported data may be distributed among, processed by, stored on, or a combination thereof, one or more of the servers 2220, 2240, 2260, and 2280. Importing the enterprise data may include importing or accessing the data structures of the enterprise data. Importing the enterprise data may include generating internal data, internal data structures, or both, based on the enterprise data. The internal data, internal data structures, or both may accurately represent and may differ from the enterprise data, the data structures of the enterprise data, or both. In some implementations, enterprise data from multiple external data sources may be imported into the internal database analysis portion 2200. For simplicity and clarity, data stored or used in the internal database analysis portion 2200 may be referred to herein as internal data. For example, the internal data, or a portion thereof, may represent, and may be distinct from, enterprise data imported into or accessed by the internal database analysis portion 2200.

The system interface portion 2300 may include one or more client devices 2320, 2340. The client devices 2320, 2340 may be computing devices, such as the computing device 1000 shown in FIG. 1. For example, one of the client devices 2320, 2340 may be a desktop or laptop computer and the other of the client devices 2320, 2340 may be a mobile device, smartphone, or tablet. One or more of the client devices 2320, 2340 may access the internal database analysis portion 2200. For example, the internal database analysis portion 2200 may provide one or more services, application interfaces, or other electronic computer communication interfaces, such as a web site, and the client devices 2320, 2340 may access the interfaces provided by the internal database analysis portion 2200, which may include accessing the internal data stored in the internal database analysis portion 2200.

In an example, one or more of the client devices 2320, 2340 may send a message or signal indicating a request for data, which may include a request for data analysis, to the internal database analysis portion 2200. The internal database analysis portion 2200 may receive and process the request, which may include distributing the processing among one or more of the servers 2220, 2240, 2260, and 2280, may generate a response to the request, which may include generating or modifying internal data, internal data structures, or both, and may output the response to the client device 2320, 2340 that sent the request. Processing the request may include accessing one or more internal data indexes, an internal database, or a combination thereof. The client device 2320, 2340 may receive the response, including the response data or a portion thereof, and may store, output, or both, the response or a representation thereof, such as a representation of the response data, or a portion thereof, which may include presenting the representation via a user interface on a presentation device of the client device 2320, 2340, such as to a user of the client device 2320, 2340.

The system interface portion 2300, or aspects thereof, such as one or more of the client devices 2320, 2340, may communicate with the internal database analysis portion 2200, or an aspect thereof, such as one or more of the servers 2220, 2240, 2260, and 2280, via an electronic communication medium, which may be a wired or wireless electronic communication medium. For example, the electronic communication medium may include a local area network (LAN), a wide area network (WAN), a fiber channel network, the Internet, or a combination thereof.

Figure 3:
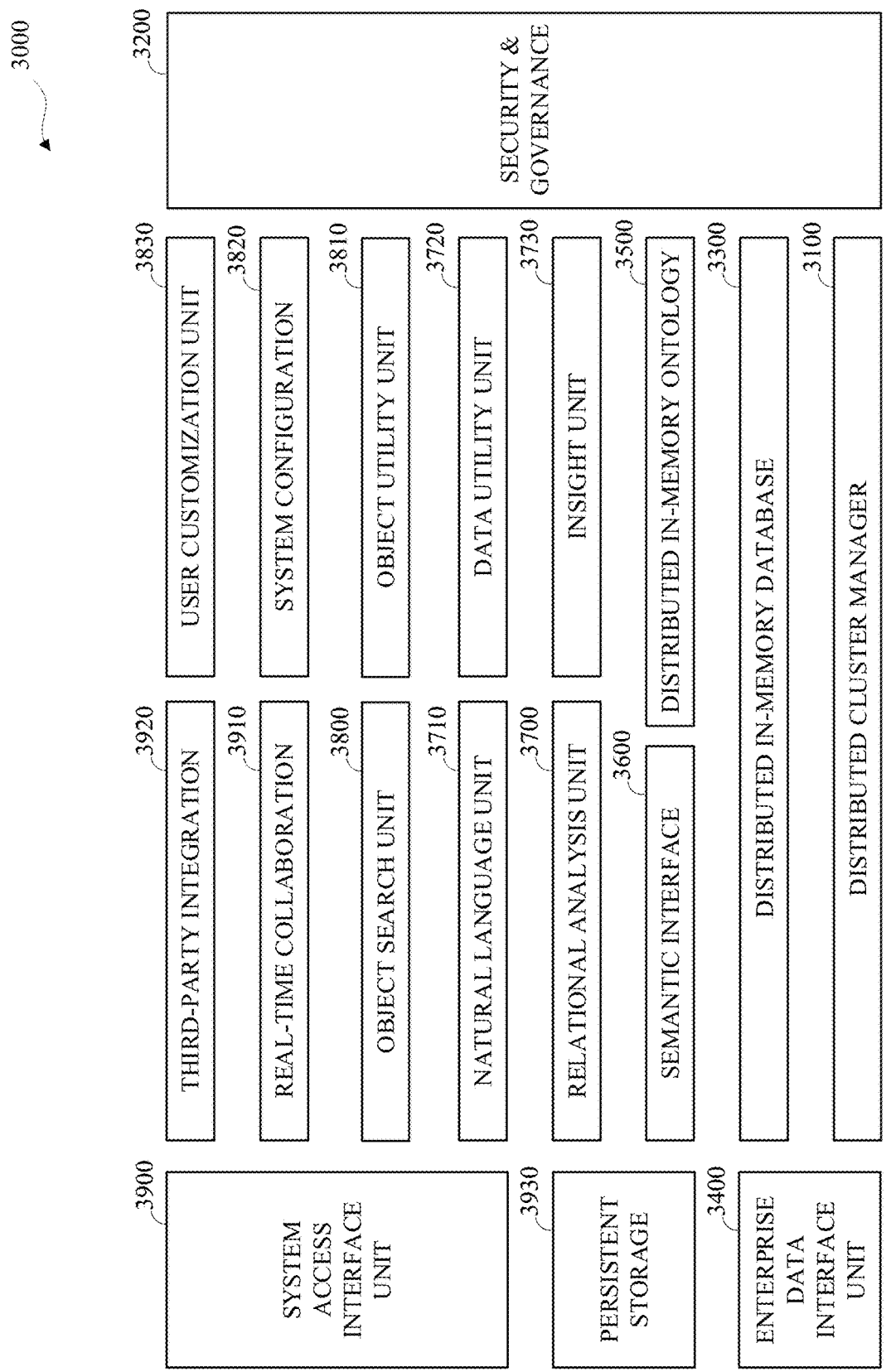
FIG. 3 is a block diagram of an example of a low-latency data analysis system.

FIG. 3 is a block diagram of an example of a low-latency data analysis system 3000. The low-latency data analysis system 3000, or aspects thereof, may be similar to the internal database analysis portion 2200 shown in FIG. 2, except as described herein or otherwise clear from context. The low-latency data analysis system 3000, or aspects thereof, may be implemented on one or more computing devices, such as servers 2220, 2240, 2260, and 2280 shown in FIG. 2, which may be in a clustered or distributed computing configuration.

The low-latency data analysis system 3000, which may be a low-latency database analysis system, may store and maintain the internal data, or a portion thereof, such as low-latency data, in a low-latency memory device, such as the low-latency memory 1300 shown in FIG. 1, or any other type of data storage medium or combination of data storage devices with relatively fast (low-latency) data access, organized in a low-latency data structure. In some embodiments, the low-latency data analysis system 3000 may be implemented as one or more logical devices in a cloud-based configuration optimized for automatic database analysis.

As shown, the low-latency data analysis system 3000 includes a distributed cluster manager 3100, a security and governance unit 3200, a distributed in-memory database 3300, an enterprise data interface unit 3400, a distributed in-memory ontology unit 3500, a semantic interface unit 3600, a relational analysis unit 3700, a natural language processing unit 3710, a data utility unit 3720, an insight unit 3730, an object search unit 3800, an object utility unit 3810, a system configuration unit 3820, a user customization unit 3830, a system access interface unit 3900, a real-time collaboration unit 3910, a third-party integration unit 3920, and a persistent storage unit 3930, which may be collectively referred to as the components of the low-latency data analysis system 3000.

Although not expressly shown in FIG. 3, one or more of the components of the low-latency data analysis system 3000 may be implemented on one or more operatively connected physical or logical computing devices, such as in a distributed cluster computing configuration, such as the internal database analysis portion 2200 shown in FIG. 2. Although shown separately in FIG. 3, one or more of the components of the low-latency data analysis system 3000, or respective aspects thereof, may be combined or otherwise organized.

The low-latency data analysis system 3000 may include different, fewer, or additional components not shown in FIG. 3. The aspects or components implemented in an instance of the low-latency data analysis system 3000 may be configurable. For example, the insight unit 3730 may be omitted or disabled. One or more of the components of the low-latency data analysis system 3000 may be implemented in a manner such that aspects thereof are divided or combined into various executable modules or libraries in a manner which may differ from that described herein.

The low-latency data analysis system 3000 may implement an application programming interface (API), which may monitor, receive, or both, input signals or messages from external devices and systems, client systems, process received signals or messages, transmit corresponding signals or messages to one or more of the components of the low-latency data analysis system 3000, and output, such as transmit or send, output messages or signals to respective external devices or systems. The low-latency data analysis system 3000 may be implemented in a distributed computing configuration.

The distributed cluster manager 3100 manages the operative configuration of the low-latency data analysis system 3000. Managing the operative configuration of the low-latency data analysis system 3000 may include controlling the implementation of and distribution of processing and storage across one or more logical devices operating on one or more physical devices, such as the servers 2220, 2240, 2260, and 2280 shown in FIG. 2. The distributed cluster manager 3100 may generate and maintain configuration data for the low-latency data analysis system 3000, such as in one or more tables, identifying the operative configuration of the low-latency data analysis system 3000. For example, the distributed cluster manager 3100 may automatically update the low-latency data analysis system configuration data in response to an operative configuration event, such as a change in availability or performance for a physical or logical unit of the low-latency data analysis system 3000. One or more of the component units of low-latency data analysis system 3000 may access the data analysis system configuration data, such as to identify intercommunication parameters or paths.

The security and governance unit 3200 may describe, implement, enforce, or a combination thereof, rules and procedures for controlling access to aspects of the low-latency data analysis system 3000, such as the internal data of the low-latency data analysis system 3000 and the features and interfaces of the low-latency data analysis system 3000. The security and governance unit 3200 may apply security at an ontological level to control or limit access to the internal data of the low-latency data analysis system 3000, such as to columns, tables, rows, or fields, which may include using row level security.

Although shown as a single unit in FIG. 3, the distributed in-memory database 3300 may be implemented in a distributed configuration, such as distributed among the servers 2220, 2240, 2260, and 2280 shown in FIG. 2, which may include multiple in-memory database instances. Each in-memory database instance may utilize one or more distinct resources, such as processing or low-latency memory resources, that differ from the resources utilized by the other in-memory database instances. In some embodiments, the in-memory database instances may utilize one or more shared resources, such as resources utilized by two or more in-memory database instances.

The distributed in-memory database 3300 may generate, maintain, or both, a low-latency data structure and data stored or maintained therein (low-latency data). The low-latency data may include principal data, which may represent enterprise data, such as enterprise data imported from an external enterprise data source, such as the external data source portion 2100 shown in FIG. 2. In some implementations, the distributed in-memory database 3300 may include system internal data representing one or more aspects, features, or configurations of the low-latency data analysis system 3000. The distributed in-memory database 3300 and the low-latency data stored therein, or a portion thereof, may be accessed using commands, messages, or signals in accordance with a defined structured query language associated with, such as implemented by, the distributed in-memory database 3300.

The low-latency data, or a portion thereof, may be organized as tables in the distributed in-memory database 3300. A table may be a data structure to organize or group the data or a portion thereof, such as related or similar data. A table may have a defined structure. For example, each table may define or describe a respective set of one or more columns.

A column may define or describe the characteristics of a discrete aspect of the data in the table. For example, the definition or description of a column may include an identifier, such as a name, for the column within the table, and one or more constraints, such as a data type, for the data corresponding to the column in the table. The definition or description of a column may include other information, such as a description of the column. The data in a table may be accessible or partitionable on a per-column basis. The set of tables, including the column definitions therein, and information describing relationships between elements, such as tables and columns, of the database may be defined or described by a database schema or design. The cardinality of columns of a table, and the definition and organization of the columns, may be defined by the database schema or design. Adding, deleting, or modifying a table, a column, the definition thereof, or a relationship or constraint thereon, may be a modification of the database design, schema, model, or structure.

The low-latency data, or a portion thereof, may be stored in the database as one or more rows or records in respective tables. Each record or row of a table may include a respective field or cell corresponding to each column of the table. A field may store a discrete data value. The cardinality of rows of a table, and the values stored therein, may be variable based on the data. Adding, deleting, or modifying rows, or the data stored therein may omit modification of the database design, schema, or structure. The data stored in respective columns may be identified or defined as a measure data, attribute data, or enterprise ontology data (e.g., metadata).

Measure data, or measure values, may include quantifiable or additive numeric values, such as integer or floatingpoint values, which may include numeric values indicating sizes, amounts, degrees, or the like. A column defined as representing measure values may be referred to herein as a measure or fact. A measure may be a property on which quantitative operations (e.g., sum, count, average, minimum, maximum) may be performed to calculate or determine a result or output.

Attribute data, or attribute values, may include non-quantifiable values, such as text or image data, which may indicate names and descriptions, quantifiable values designated, defined, or identified as attribute data, such as numeric unit identifiers, or a combination thereof. A column defined as including attribute values may be referred to herein as an attribute or dimension. For example, attributes may include text, identifiers, timestamps, or the like.

Enterprise ontology data may include data that defines or describes one or more aspects of the database, such as data that describes one or more aspects of the attributes, measures, rows, columns, tables, relationships, or other aspects of the data or database schema. For example, a portion of the database design, model, or schema may be represented as enterprise ontology data in one or more tables in the database.

Distinctly identifiable data in the low-latency data may be referred to herein as a data portion. For example, the low-latency data stored in the distributed in-memory database 3300 may be referred to herein as a data portion, a table from the low-latency data may be referred to herein as a data portion, a column from the low-latency data may be referred to herein as a data portion, a row or record from the low-latency data may be referred to herein as a data portion, a value from the low-latency data may be referred to herein as a data portion, a relationship defined in the low-latency data may be referred to herein as a data portion, enterprise ontology data describing the low-latency data may be referred to herein as a data portion, or any other distinctly identifiable data, or combination thereof, from the low-latency data may be referred to herein as a data portion.

The distributed in-memory database 3300 may create or add one or more data portions, such as a table, may read from or access one or more data portions, may update or modify one or more data portions, may remove or delete one or more data portions, or a combination thereof. Adding, modifying, or removing data portions may include changes to the data model of the low-latency data. Changing the data model of the low-latency data may include notifying one or more other components of the low-latency data analysis system 3000, such as by sending, or otherwise making available, a message or signal indicating the change. For example, the distributed in-memory database 3300 may create or add a table to the low-latency data and may transmit or send a message or signal indicating the change to the semantic interface unit 3600.

In some implementations, a portion of the low-latency data may represent a data model of an external enterprise database and may omit the data stored in the external enterprise database, or a portion thereof. For example, prioritized data may be cached in the distributed in-memory database 3300 and the other data may be omitted from storage in the distributed in-memory database 3300, which may be stored in the external enterprise database. In some implementations, requesting data from the distributed in-memory database 3300 may include requesting the data, or a portion thereof, from the external enterprise database.

The distributed in-memory database 3300 may receive one or more messages or signals indicating respective data-queries for the low-latency data, or a portion thereof, which may include data-queries for modified, generated, or aggregated data generated based on the low-latency data, or a portion thereof. For example, the distributed in-memory database 3300 may receive a data-query from the semantic interface unit 3600, such as in accordance with a request for data. The data-queries received by the distributed in-memory database 3300 may be agnostic to the distributed configuration of the distributed in-memory database 3300. A data-query, or a portion thereof, may be expressed in accordance with the defined structured query language implemented by the distributed in-memory database 3300. In some implementations, a data-query, or a portion thereof, may be expressed in accordance with a defined structured query language implemented by a defined database other than the distributed in-memory database 3300, such as an external database. In some implementations, a data-query may be included, such as stored or communicated, in a data-query data structure or container.

The distributed in-memory database 3300 may execute or perform one or more queries to generate or obtain response data responsive to the data-query based on the low-latency data. Unless expressly described, or otherwise clear from context, descriptions herein of a table in the context of performing, processing, or executing a data-query that include accessing, such as reading, writing, or otherwise using, a table, or data from a table, may refer to a table stored, or otherwise maintained, in the low-latency distributed database independently of the data-query or may refer to tabular data obtained, such as generated, in accordance with the data-query.

The distributed in-memory database 3300 may interpret, evaluate, or otherwise process a data-query to generate one or more distributed-queries, which may be expressed in accordance with the defined structured query language. For example, an in-memory database instance of the distributed in-memory database 3300 may be identified as a query coordinator. The query coordinator may generate a query plan, which may include generating one or more distributed-queries, based on the received data-query. The query plan may include query execution instructions for executing one or more queries, or one or more portions thereof, based on the received data-query by the one or more of the in-memory database instances. Generating the query plan may include optimizing the query plan. The query coordinator may distribute, or otherwise make available, the respective portions of the query plan, as query execution instructions, to the corresponding in-memory database instances.

The respective in-memory database instances may receive the corresponding query execution instructions from the query coordinator. The respective in-memory database instances may execute the corresponding query execution instructions to obtain, process, or both, data (intermediate results data) from the low-latency data. The respective in-memory database instances may output, or otherwise make available, the intermediate results data, such as to the query coordinator.

The query coordinator may execute a respective portion of query execution instructions (allocated to the query coordinator) to obtain, process, or both, data (intermediate results data) from the low-latency data. The query coordinator may receive, or otherwise access, the intermediate results data from the respective in-memory database instances. The query coordinator may combine, aggregate, or otherwise process, the intermediate results data to obtain results data.

In some embodiments, obtaining the intermediate results data by one or more of the in-memory database instances may include outputting the intermediate results data to, or obtaining intermediate results data from, one or more other in-memory database instances, in addition to, or instead of, obtaining the intermediate results data from the low-latency data.

The distributed in-memory database 3300 may output, or otherwise make available, the results data to the semantic interface unit 3600.

The enterprise data interface unit 3400 may interface with, or communicate with, an external enterprise data system. For example, the enterprise data interface unit 3400 may receive or access enterprise data from or in an external system, such as an external database. The enterprise data interface unit 3400 may import, evaluate, or otherwise process the enterprise data to populate, create, or modify data stored in the low-latency data analysis system 3000. The enterprise data interface unit 3400 may receive, or otherwise access, the enterprise data from one or more external data sources, such as the external data source portion 2100 shown in FIG. 2, and may represent the enterprise data in the low-latency data analysis system 3000 by importing, loading, or populating the enterprise data as principal data in the distributed in-memory database 3300, such as in one or more low-latency data structures. The enterprise data interface unit 3400 may implement one or more data connectors, which may transfer data between, for example, the external data source and the distributed in-memory database 3300, which may include altering, formatting, evaluating, or manipulating the data.

The enterprise data interface unit 3400 may receive, access, or generate metadata that identifies one or more parameters or relationships for the principal data, such as based on the enterprise data, and may include the generated metadata in the low-latency data stored in the distributed in-memory database 3300. For example, the enterprise data interface unit 3400 may identify characteristics of the principal data such as, attributes, measures, values, unique identifiers, tags, links, keys, or the like, and may include metadata representing the identified characteristics in the low-latency data stored in the distributed in-memory database 3300. The characteristics of the data can be automatically determined by receiving, accessing, processing, evaluating, or interpreting the schema in which the enterprise data is stored, which may include automatically identifying links or relationships between columns, classifying columns (e.g., using column names), and analyzing or evaluating the data.

Distinctly identifiable operative data units or structures representing one or more data portions, one or more entities, users, groups, or organizations represented in the internal data, or one or more aggregations, collections, relations, analytical results, visualizations, or groupings thereof, may be represented in the low-latency data analysis system 3000 as objects. An object may include a unique identifier for the object, such as a fully qualified name. An object may include a name, such as a displayable value, for the object.

For example, an object may represent a user, a group, an entity, an organization, a privilege, a role, a table, a column, a data relationship, a worksheet, a view, an access-context, an answer, an insight, a pinboard, a tag, a comment, a trigger, a defined variable, a data source, an object-level security rule, a row-level security rule, or any other data capable of being distinctly identified and stored or otherwise obtained in the low-latency data analysis system 3000. An object may represent or correspond with a logical entity. Data describing an object may include data operatively or uniquely identifying data corresponding to, or represented by, the object in the low-latency data analysis system. For example, a column in a table in a database in the low-latency data analysis system may be represented in the low-latency data analysis system as an object and the data describing or defining the object may include data operatively or uniquely identifying the column.

A worksheet (worksheet object), or worksheet table, may be a logical table, or a definition thereof, which may be a collection, a sub-set (such as a subset of columns from one or more tables), or both, of data from one or more data sources, such as columns in one or more tables, such as in the distributed in-memory database 3300. A worksheet, or a definition thereof, may include one or more data organization or manipulation definitions, such as join paths or worksheet-column definitions, which may be user defined. A worksheet may be a data structure that may contain one or more rules or definitions that may define or describe how a respective tabular set of data may be obtained, which may include defining one or more sources of data, such as one or more columns from the distributed in-memory database 3300. A worksheet may be a data source. For example, a worksheet may include references to one or more data sources, such as columns in one or more tables, such as in the distributed in-memory database 3300, and a request for data referencing the worksheet may access the data from the data sources referenced in the worksheet. In some implementations, a worksheet may omit aggregations of the data from the data sources referenced in the worksheet.

An answer (answer object), or report, may represent a defined, such as previously generated, request for data, such as a resolved-request. An answer may include information describing a visualization of data responsive to the request for data.

A visualization (visualization object) may be a defined representation or expression of data, such as a visual representation of the data, for presentation to a user or human observer, such as via a user interface. Although described as a visual representation, in some implementations, a visualization may include non-visual aspects, such as auditory or haptic presentation aspects. A visualization may be generated to represent a defined set of data in accordance with a defined visualization type or template (visualization template object), such as in a chart, graph, or tabular form. Example visualization types may include, and are not limited to, chloropleths, cartograms, dot distribution maps, proportional symbol maps, contour/isopleth/isarithmic maps, daysymetric map, self-organizing map, timeline, time series, connected scatter plots, Gantt charts, steam graph/theme river, arc diagrams, polar area/rose/circumplex charts, Sankey diagrams, alluvial diagrams, pie charts, histograms, tag clouds, bubble charts, bubble clouds, bar charts, radial bar charts, tree maps, scatter plots, line charts, step charts, area charts, stacked graphs, heat maps, parallel coordinates, spider charts, box and whisker plots, mosaic displays, waterfall charts, funnel charts, or radial tree maps. A visualization template may define or describe one or more visualization parameters, such as one or more color parameters. Visualization data for a visualization may include values of one or more of the visualization parameters of the corresponding visualization template.

A view (view object) may be a logical table, or a definition thereof, which may be a collection, a sub-set, or both, of data from one or more data sources, such as columns in one or more tables, such as in the distributed in-memory database 3300. For example, a view may be generated based on an answer, such as by storing the answer as a view. A view may define or describe a data aggregation. A view may be a data source. For example, a view may include references to one or more data sources, such as columns in one or more tables, such as in the distributed in-memory database 3300, which may include a definition or description of an aggregation of the data from a respective data source, and a request for data referencing the view may access the aggregated data, the data from the unaggregated data sources referenced in the worksheet, or a combination thereof. The unaggregated data from data sources referenced in the view defined or described as aggregated data in the view may be unavailable based on the view. A view may be a materialized view or an unmaterialized view. A request for data referencing a materialized view may obtain data from a set of data previously obtained (view-materialization) in accordance with the definition of the view and the request for data. A request for data referencing an unmaterialized view may obtain data from a set of data currently obtained in accordance with the definition of the view and the request for data.

A pinboard (pinboard object), or dashboard, may be a defined collection or grouping of objects, such as visualizations, answers, or insights. Pinboard data for a pinboard may include information associated with the pinboard, which may be associated with respective objects included in the pinboard.

An access-context (access-context object) may be a set or collection of data associated with data expressing usage intent, such as a request for data, data responsive to data expressing usage intent, or a discretely related sequence or series of requests for data or other interactions with the low-latency data analysis system 3000, and a corresponding data structure for containing such data.

A definition may be a set of data describing the structure or organization of a data portion. For example, in the distributed in-memory database 3300, a column definition may define one or more aspects of a column in a table, such as a name of the column, a description of the column, a datatype for the column, or any other information about the column that may be represented as discrete data.

A data source object may represent a source or repository of data accessible by the low-latency data analysis system 3000. A data source object may include data indicating an electronic communication location, such as an address, of a data source, connection information, such as protocol information, authentication information, or a combination thereof, or any other information about the data source that may be represented as discrete data. For example, a data source object may represent a table in the distributed in-memory database 3300 and include data for accessing the table from the database, such as information identifying the database, information identifying a schema within the database, and information identifying the table within the schema within the database. An external data source object may represent an external data source. For example, an external data source object may include data indicating an electronic communication location, such as an address, of an external data source, connection information, such as protocol information, authentication information, or a combination thereof, or any other information about the external data source that may be represented as discrete data.

A sticker (sticker object) may be a description of a classification, category, tag, subject area, or other information that may be associated with one or more other objects such that objects associated with a sticker may be grouped, sorted, filtered, or otherwise identified based on the sticker. In the distributed in-memory database 3300 a tag may be a discrete data portion that may be associated with other data portions, such that data portions associated with a tag may be grouped, sorted, filtered, or otherwise identified based on the tag.

The distributed in-memory ontology unit 3500 generates, maintains, or both, information (ontological data) defining or describing the operative ontological structure of the objects represented in the low-latency data analysis system 3000, such as in the low-latency data stored in the distributed in-memory database 3300, which may include describing attributes, properties, states, or other information about respective objects and may include describing relationships among respective objects.

Objects may be referred to herein as primary objects, secondary objects, or tertiary objects. Other types of objects may be used.

Primary objects may include objects representing distinctly identifiable operative data units or structures representing one or more data portions in the distributed in-memory database 3300, or another data source in the low-latency data analysis system 3000. For example, primary objects may be data source objects, table objects, column objects, relationship objects, or the like. Primary objects may include worksheets, views, filters, such as row-level-security filters and table filters, variables, or the like. Primary objects may be referred to herein as data-objects or queryable-objects.

Secondary objects may be objects representing distinctly identifiable operative data units or structures representing analytical data aggregations, collections, analytical results, visualizations, or groupings thereof, such as pinboard objects, answer objects, insights, visualization objects, resolved-request objects, and the like. Secondary objects may be referred to herein as analytical-objects.

Tertiary objects may be objects representing distinctly identifiable operative data units or structures representing operational aspects of the low-latency data analysis system 3000, such as one or more entities, users, groups, or organizations represented in the internal data, such as user objects, user-group objects, role objects, sticker objects, and the like.

The distributed in-memory ontology unit 3500 may represent the ontological structure, which may include the objects therein, as a graph having nodes and edges. A node may be a representation of an object in the graph structure of the distributed in-memory ontology unit 3500. A node, representing an object, can include one or more components. The components of a node may be versioned, such as on a per-component basis. For example, a node can include a header component, a content component, or both. A header component may include information about the node. A content component may include the content of the node. An edge may represent a relationship between nodes, which may be directional.

In some implementations, the distributed in-memory ontology unit 3500 graph may include one or more nodes, edges, or both, representing one or more objects, relationships or both, corresponding to a respective internal representation of enterprise data stored in an external enterprise data storage unit, wherein a portion of the data stored in the external enterprise data storage unit represented in the distributed in-memory ontology unit 3500 graph is omitted from the distributed in-memory database 3300.

In some embodiments, the distributed in-memory ontology unit 3500 may generate, modify, or remove a portion of the ontology graph in response to one or more messages, signals, or notifications from one or more of the components of the low-latency data analysis system 3000. For example, the distributed in-memory ontology unit 3500 may generate, modify, or remove a portion of the ontology graph in response to receiving one or more messages, signals, or notifications from the distributed in-memory database 3300 indicating a change to the low-latency data structure. In another example, the distributed in-memory database 3300 may send one or more messages, signals, or notifications indicating a change to the low-latency data structure to the semantic interface unit 3600 and the semantic interface unit 3600 may send one or more messages, signals, or notifications indicating the change to the low-latency data structure to the distributed in-memory ontology unit 3500.

The distributed in-memory ontology unit 3500 may be distributed, in-memory, multi-versioned, transactional, consistent, durable, or a combination thereof. The distributed in-memory ontology unit 3500 is transactional, which may include implementing atomic concurrent, or substantially concurrent, updating of multiple objects. The distributed in-memory ontology unit 3500 is durable, which may include implementing a robust storage that prevents data loss subsequent to or as a result of the completion of an atomic operation. The distributed in-memory ontology unit 3500 is consistent, which may include performing operations associated with a request for data with reference to or using a discrete data set, which may mitigate or eliminate the risk inconsistent results.

The distributed in-memory ontology unit 3500 may generate, output, or both, one or more event notifications. For example, the distributed in-memory ontology unit 3500 may generate, output, or both, a notification, or notifications, in response to a change of the distributed in-memory ontology. The distributed in-memory ontology unit 3500 may identify a portion of the distributed in-memory ontology (graph) associated with a change of the distributed in-memory ontology, such as one or more nodes depending from a changed node, and may generate, output, or both, a notification, or notifications indicating the identified relevant portion of the distributed in-memory ontology (graph). One or more aspects of the low-latency data analysis system 3000 may cache object data and may receive the notifications from the distributed in-memory ontology unit 3500, which may reduce latency and network traffic relative to systems that omit caching object data or omit notifications relevant to changes to portions of the distributed in-memory ontology (graph).

The distributed in-memory ontology unit 3500 may implement prefetching. For example, the distributed in-memory ontology unit 3500 may predictively, such as based on determined probabilistic utility, fetch one or more nodes, such as in response to access to a related node by a component of the low-latency data analysis system 3000.

The distributed in-memory ontology unit 3500 may implement a multi-version concurrency control graph data storage unit. Each node, object, or both, may be versioned. Changes to the distributed in-memory ontology may be reversible. For example, the distributed in-memory ontology may have a first state prior to a change to the distributed in-memory ontology, the distributed in-memory ontology may have a second state subsequent to the change, and the state of the distributed in-memory ontology may be reverted to the first state subsequent to the change, such as in response to the identification of an error or failure associated with the second state.

In some implementations, reverting a node, or a set of nodes, may omit reverting one or more other nodes. In some implementations, the distributed in-memory ontology unit 3500 may maintain a change log indicating a sequential record of changes to the distributed in-memory ontology (graph), such that a change to a node or a set of nodes may be reverted and one or more other changes subsequent to the reverted change may be reverted for consistency.

The distributed in-memory ontology unit 3500 may implement optimistic locking to reduce lock contention times. The use of optimistic locking permits improved throughput of data through the distributed in-memory ontology unit 3500.

The semantic interface unit 3600 may implement procedures and functions to provide a semantic interface between the distributed in-memory database 3300 and one or more of the other components of the low-latency data analysis system 3000.

The semantic interface unit 3600 may implement ontological data management, data-query generation, authentication and access control, object statistical data collection, or a combination thereof.

Ontological data management may include object lifecycle management, object data persistence, ontological modifications, or the like. Object lifecycle management may include creating one or more objects, reading or otherwise accessing one or more objects, updating or modifying one or more objects, deleting or removing one or more objects, or a combination thereof. For example, the semantic interface unit 3600 may interface or communicate with the distributed in-memory ontology unit 3500, which may store the ontological data, object data, or both, to perform object lifecycle management, object data persistence, ontological modifications, or the like.

For example, the semantic interface unit 3600 may receive, or otherwise access, a message, signal, or notification, such as from the distributed in-memory database 3300, indicating the creation or addition of a data portion, such as a table, in the low-latency data stored in the distributed in-memory database 3300, and the semantic interface unit 3600 may communicate with the distributed in-memory ontology unit 3500 to create an object in the ontology representing the added data portion. The semantic interface unit 3600 may transmit, send, or otherwise make available, a notification, message, or signal to the relational analysis unit 3700 indicating that the ontology has changed.

The semantic interface unit 3600 may receive, or otherwise access, a request message or signal, such as from the relational analysis unit 3700, indicating a request for information describing changes to the ontology (ontological updates request). The semantic interface unit 3600 may generate and send, or otherwise make available, a response message or signal to the relational analysis unit 3700 indicating the changes to the ontology (ontological updates response). The semantic interface unit 3600 may identify one or more data portions for indexing based on the changes to the ontology. For example, the changes to the ontology may include adding a table to the ontology, the table including multiple rows, and the semantic interface unit 3600 may identify each row as a data portion for indexing. The semantic interface unit 3600 may include information describing the ontological changes in the ontological updates response. The semantic interface unit 3600 may include one or more data-query definitions, such as data-query definitions for indexing data-queries, for each data portion identified for indexing in the ontological updates response. For example, the data-query definitions may include a sampling data-query, which may be used to query the distributed in-memory database 3300 for sample data from the added data portion, an indexing data-query, which may be used to query the distributed in-memory database 3300 for data from the added data portion, or both.

The semantic interface unit 3600 may receive, or otherwise access, internal signals or messages including data expressing usage intent, such as data indicating requests to access or modify the low-latency data stored in the distributed in-memory database 3300 (e.g., a request for data). The request to access or modify the low-latency data received by the semantic interface unit 3600 may include a resolved-request, such as in a resolved-request object, such as a resolved-request object generated by the relational analysis unit 3700. The resolved-request, which may be database and visualization agnostic, may be expressed or communicated as an ordered sequence of tokens, which may represent semantic data.

A token is a unit of data in the low-latency data analysis system 3000 that represents, in accordance with one or more defined grammars implemented by the low-latency data analysis system 3000, a data portion accessed by or stored in the low-latency data analysis system 3000, an operation of the low-latency data analysis system 3000, an object represented in the low-latency data analysis system 3000, or a class or type of data portion, operation, or object in the low-latency data analysis system 3000. A token may be a value (token value), such as a string value, which may be a word, a character, a sequence of characters, a symbol, a combination of symbols, or the like. In some implementations, the token value may express a data pattern that defines or describes values, operations, or objects that the token represents. For example, the data pattern expressed by the token value may identify a data type, such as positive integer, such that positive integer values, or string values that may be represented as positive integer values, may be identified as matching the token. A token may be a defined data structure (token data structure) that includes a token value. A token data structure may include data other than the token value, such as token type data.

The defined grammars implemented by the low-latency data analysis system 3000 may define or describe the tokens. The defined grammars implemented by the low-latency data analysis system 3000 may define or describe token types or classes, such as ontological tokens, control-word tokens, pattern tokens, literal tokens, and a skip-token. Other token types may be used.

An ontological token may represent a data portion in the low-latency data analysis system, such as an object represented in the low-latency data analysis system 3000, or a portion thereof, a table stored in the distributed in-memory database or stored in an external database, a column of a table stored in the distributed in-memory database or stored in an external database, or a value (constituent data) stored in a row and column of a table stored in the distributed in-memory database or stored in an external database. In some grammars implemented by the low-latency data analysis system 3000 the ontological tokens may include measure tokens representing measure data portions (measure columns), attribute tokens representing attribute data portions (attribute columns), and value tokens representing the respective values stored in the corresponding measure columns or attribute columns. For example, a worksheet object (analytical-object) represented in the low-latency data analysis system 3000 may include a column that includes values generated based on values stored in one or more tables in the distributed in-memory database, and an ontological token may represent the column of the worksheet object.

A control-word token may be a character, a symbol, a word, or a defined ordered sequence of characters or symbols, defined or described in one or more grammars of the low-latency data analysis system 3000 as having one or more defined grammatical functions, which may be contextual. For example, the control-word token "sum" may be defined or described in one or more grammars of the low-latency data analysis system 3000 as indicating an additive aggregation. In another example, the control-word token "top" may be defined or described in one or more grammars of the low-latency data analysis system 3000 as indicating a maximal value from an ordered set. In another example, the control-word token "table" may be defined or described in one or more grammars of the low-latency data analysis system 3000 as indicating a table stored in the low-latency data analysis system 3000 or stored externally and accessed by the low-latency data analysis system 3000. The control-word tokens may include operator tokens, such as the equality operator token ("="), delimiter tokens, which may be paired, such as opening and closing brackets ("[", "]"). The control-word tokens may include stop-word tokens, such as "the" or "an".

A pattern token may be a definition or a description of unit of data in the low-latency data analysis system, which may be expressed as a data type, such as positive integer, defined or described in one or more grammars of the low-latency data analysis system 3000.

The literal, or constant, tokens may include literal, or constant, values such as "100" or the Boolean value TRUE. The literal, or constant, tokens may include number-word tokens (numerals or named numbers), such as number-word tokens for the positive integers between zero and one million, inclusive, or for the numerator, denominator, or both of fractional values, or combinations thereof. For example, "one hundred twenty-eight and three-fifths".

The skip-token may represent discrete data portions, such as respective portions of a string that are unresolvable in accordance with the other tokens defined or described in a respective grammar of the low-latency data analysis system 3000.

The relational analysis unit 3700 may automatically generate respective tokens representing the attributes, the measures, the tables, the columns, the values, unique identifiers, tags, links, keys, or any other data portion, or combination of data portions, or a portion thereof.

For example, the relational analysis unit 3700 may tokenize, identify semantics, or both, based on input data, such as input data representing user input, to generate the resolved-request. The resolved-request may include an ordered sequence of tokens that represent the request for data corresponding to the input data, and may transmit, send, or otherwise make accessible, the resolved-request to the semantic interface unit 3600. The semantic interface unit 3600 may process or respond to a received resolved-request.

The semantic interface unit 3600 may process or transform the received resolved-request, which may be, at least in part, incompatible with the distributed in-memory database 3300, to generate one or more corresponding data-queries that are compatible with the distributed in-memory database 3300, which may include generating a proto-query representing the resolved-request, generating a pseudo-query representing the proto-query, and generating the data-query representing the pseudo-query.

The semantic interface unit 3600 may generate an analytical-object, such as an answer object, representing the resolved-request, which may include representing the data expressing usage intent, such as by representing the request for data indicated by the data expressing usage intent.

The semantic interface unit 3600 may generate a proto-query based on the resolved-request. A proto-query, which may be database agnostic, may be structured or formatted in a form, language, or protocol that differs from the defined structured query language of the distributed in-memory database 3300. Generating the proto-query may include identifying visualization identification data, such as an indication of a type of visualization, associated with the request for data, and generating the proto-query based on the resolved-request and the visualization identification data.

The semantic interface unit 3600 may transform the proto-query to generate a pseudo-query. The pseudo-query, which may be database agnostic, may be structured or formatted in a form, language, or protocol that differs from the defined structured query language of the distributed in-memory database 3300. Generating a pseudo-query may include applying a defined transformation, or an ordered sequence of transformations. Generating a pseudo-query may include incorporating row-level security filters in the pseudo-query.

The semantic interface unit 3600 may generate a data-query based on the pseudo-query, such as by serializing the pseudo-query. The data-query, or a portion thereof, may be structured or formatted using the defined structured query language of the distributed in-memory database 3300. In some implementations, a data-query may be structured or formatted using a defined structured query language of another database, which may differ from the defined structured query language of the distributed in-memory database 3300. Generating the data-query may include using one or more defined rules for expressing respective the structure and content of a pseudo-query in the respective defined structured query language.

The semantic interface unit 3600 may communicate, or issue, the data-query to the distributed in-memory database 3300. In some implementations, processing or responding to a resolved-request may include generating and issuing multiple data-queries to the distributed in-memory database 3300.

The semantic interface unit 3600 may receive results data from the distributed in-memory database 3300 responsive to one or more resolved-requests. The semantic interface unit 3600 may process, format, or transform the results data to obtain visualization data. For example, the semantic interface unit 3600 may identify a visualization for representing or presenting the results data, or a portion thereof, such as based on the results data or a portion thereof. For example, the semantic interface unit 3600 may identifying a bar chart visualization for results data including one measure and attribute.

Although not shown separately in FIG. 3, the semantic interface unit 3600 may include a data visualization unit. In some embodiments, the data visualization unit may be a distinct unit, separate from the semantic interface unit 3600. In some embodiments, the data visualization unit may be included in the system access interface unit 3900. The data visualization unit, the system access interface unit 3900, or a combination thereof, may generate a user interface, or one or more portions thereof. For example, data visualization unit, the system access interface unit 3900, or a combination thereof, may obtain the results data, such as the visualization data, and may generate user interface elements (visualizations) representing the results data.

The semantic interface unit 3600 may implement object-level security, row-level security, or a combination thereof. Object level security may include security associated with an object, such as a table, a column, a worksheet, an answer, or a pinboard. Row-level security may include user-based or group-based access control of rows of data in the low-latency data, the indexes, or both. The semantic interface unit 3600 may implement on or more authentication procedures, access control procedures, or a combination thereof.

The semantic interface unit 3600 may implement one or more user-data integration features. For example, the semantic interface unit 3600 may generate and output a user interface, or a portion thereof, for inputting, uploading, or importing user data, may receive user data, and may import the user data. For example, the user data may be enterprise data.

The semantic interface unit 3600 may implement object statistical data collection. Object statistical data may include, for respective objects, temporal access information, access frequency information, access recency information, access requester information, or the like. For example, the semantic interface unit 3600 may obtain object statistical data as described with respect to the data utility unit 3720, the object utility unit 3810, or both. The semantic interface unit 3600 may send, transmit, or otherwise make available, the object statistical data for data-objects to the data utility unit 3720. The semantic interface unit 3600 may send, transmit, or otherwise make available, the object statistical data for analytical-objects to the object utility unit 3810.

The semantic interface unit 3600 may implement or expose one or more services or application programming interfaces. For example, the semantic interface unit 3600 may implement one or more services for access by the system access interface unit 3900. In some implementations, one or more services or application programming interfaces may be exposed to one or more external devices or systems.

The semantic interface unit 3600 may generate and transmit, send, or otherwise communicate, one or more external communications, such as e-mail messages, such as periodically, in response to one or more events, or both. For example, the semantic interface unit 3600 may generate and transmit, send, or otherwise communicate, one or more external communications including a portable representation, such as a portable document format representation of one or more pinboards in accordance with a defined schedule, period, or interval. In another example, the semantic interface unit 3600 may generate and transmit, send, or otherwise communicate, one or more external communications in response to input data indicating an express request for a communication. In another example, the semantic interface unit 3600 may generate and transmit, send, or otherwise communicate, one or more external communications in response to one or more defined events, such as the expiration of a recency of access period for a user.

Although shown as a single unit in FIG. 3, the relational analysis unit 3700 may be implemented in a distributed configuration, which may include a primary relational analysis unit instance and one or more secondary relational analysis unit instances.

The relational analysis unit 3700 may generate, maintain, operate, or a combination thereof, one or more indexes, such as one or more of an ontological index, a constituent data index, a control-word index, a numeral index, or a constant index, based on the low-latency data stored in the distributed in-memory database 3300, the low-latency data analysis system 3000, or both. An index may be a defined data structure, or combination of data structures, for storing tokens, terms, or string keys, representing a set of data from one or more defined data sources in a form optimized for searching. For example, an index may be a collection of index shards. In some implementations, an index may be segmented into index segments and the index segments may be sharded into index shards. In some implementations, an index may be partitioned into index partitions, the index partitions may be segmented into index segments and the index segments may be sharded into index shards.

Generating, or building, an index may be performed to create or populate a previously unavailable index, which may be referred to as indexing the corresponding data, and may include regenerating, rebuilding, or reindexing to update or modify a previously available index, such as in response to a change in the indexed data (constituent data).

The ontological index may be an index of data (ontological data) describing the ontological structure or schema of the low-latency data analysis system 3000, the low-latency data stored in the distributed in-memory database 3300, or a combination thereof. For example, the ontological index may include data representing the table and column structure of the distributed in-memory database 3300. The relational analysis unit 3700 may generate, maintain, or both, the ontological index by communicating with, such as requesting ontological data from, the distributed in-memory ontology unit 3500, the semantic interface unit 3600, or both. Each record in the ontological index may correspond to a respective ontological token, such as a token that identifies a column by name.

The control-word index may be an index of a defined set of control-word tokens. For example, the control-word index may include the control-word token "sum", which may be identified in one or more grammars of the low-latency data analysis system 3000 as indicating an additive aggregation. The constant index may be an index of constant, or literal, tokens such as "100" or "true". The numeral index may be an index of number word tokens (or named numbers), such as number word tokens for the positive integers between zero and one million, inclusive.

The constituent data index may be an index of the constituent data values stored in the low-latency data analysis system 3000, such as in the distributed in-memory database 3300. The relational analysis unit 3700 may generate, maintain, or both, the constituent data index by communicating with, such as requesting data from, the distributed in-memory database 3300. For example, the relational analysis unit 3700 may send, or otherwise communicate, a message or signal to the distributed in-memory database 3300 indicating a request to perform an indexing data-query, the relational analysis unit 3700 may receive response data from the distributed in-memory database 3300 in response to the requested indexing data-query, and the relational analysis unit 3700 may generate the constituent data index, or a portion thereof, based on the response data. For example, the constituent data index may index data-objects.

An index shard may be used for token searching, such as exact match searching, prefix match searching, substring match searching, or suffix match searching. Exact match searching may include identifying tokens in the index shard that matches a defined target value. Prefix match searching may include identifying tokens in the index shard that include a prefix, or begin with a value, such as a character or string, that matches a defined target value. Substring match searching may include identifying tokens in the index shard that include a value, such as a character or string, that matches a defined target value. Suffix match searching may include identifying tokens in the index shard that include a suffix, or end with a value, such as a character or string, that matches a defined target value. In some implementations, an index shard may include multiple distinct index data structures. For example, an index shard may include a first index data structure optimized for exact match searching, prefix match searching, and suffix match searching, and a second index data structure optimized for substring match searching. Traversing, or otherwise accessing, managing, or using, an index may include identifying one or more of the index shards of the index and traversing the respective index shards. In some implementations, one or more indexes, or index shards, may be distributed, such as replicated on multiple relational analysis unit instances. For example, the ontological index may be replicated on each relational analysis unit instance.

The relational analysis unit 3700 may receive a request for data from the low-latency data analysis system 3000. For example, the relational analysis unit 3700 may receive data expressing usage intent indicating the request for data in response to input, such as user input, obtained via a user interface, such as a user interface generated, or partially generated, by the system access interface unit 3900, which may be a user interface operated on an external device, such as one of the client devices 2320, 2340 shown in FIG. 2. In some implementations, the relational analysis unit 3700 may receive the data expressing usage intent from the system access interface unit 3900 or from the semantic interface unit 3600. For example, the relational analysis unit 3700 may receive or access the data expressing usage intent in a request for data message or signal.

The relational analysis unit 3700 may process, parse, identify semantics, tokenize, or a combination thereof, the request for data to generate a resolved-request, which may include identifying a database and visualization agnostic ordered sequence of tokens based on the data expressing usage intent. The data expressing usage intent, or request for data, may include request data, such as resolved-request data, unresolved request data, or a combination of resolved-request data and unresolved request data. The relational analysis unit 3700 may identify the resolved-request data. The relational analysis unit 3700 may identify the unresolved request data and may tokenize the unresolved request data.

Resolved-request data may be request data identified in the data expressing usage intent as resolved-request data. Each resolved-request data portion may correspond with a respective token in the low-latency data analysis system 3000. The data expressing usage intent may include information identifying one or more portions of the request data as resolved-request data.

Unresolved request data may be request data identified in the data expressing usage intent as unresolved request data, or request data for which the data expressing usage intent omits information identifying the request data as resolved-request data. Unresolved request data may include text or string data, which may include a character, sequence of characters, symbol, combination of symbols, word, sequence of words, phrase, or the like, for which information, such as tokenization binding data, identifying the text or string data as resolved-request data is absent or omitted from the request data. The data expressing usage intent may include information identifying one or more portions of the request data as unresolved request data. The data expressing usage intent may omit information identifying whether one or more portions of the request data are resolved-request data. The relational analysis unit 3700 may identify one or more portions of the request data for which the data expressing usage intent omits information identifying whether the one or more portions of the request data are resolved-request data as unresolved request data.

For example, the data expressing usage intent may include a request string and one or more indications that one or more portions of the request string are resolved-request data. One or more portions of the request string that are not identified as resolved-request data in the data expressing usage intent may be identified as unresolved request data. For example, the data expressing usage intent may include the request string "example text"; the data expressing usage intent may include information indicating that the first portion of the request string, "example", is resolved-request data; and the data expressing usage intent may omit information indicating that the second portion of the request string, "text", is resolved-request data.

The information identifying one or more portions of the request data as resolved-request data may include tokenization binding data indicating a previously identified token corresponding to the respective portion of the request data. The tokenization binding data corresponding to a respective token may include, for example, one or more of a column identifier indicating a column corresponding to the respective token, a data type identifier corresponding to the respective token, a table identifier indicating a table corresponding to the respective token, an indication of an aggregation corresponding to the respective token, or an indication of a join path associated with the respective token. Other tokenization binding data may be used. In some implementations, the data expressing usage intent may omit the tokenization binding data and may include an identifier that identifies the tokenization binding data.

The relational analysis unit 3700 may implement or access one or more grammar-specific tokenizers, such as a tokenizer for a defined data-analytics grammar or a tokenizer for a natural-language grammar. For example, the relational analysis unit 3700 may implement one or more of a formula tokenizer, a row-level-security tokenizer, a data-analytics tokenizer, or a natural language tokenizer. Other tokenizers may be used. In some implementations, the relational analysis unit 3700 may implement one or more of the grammar-specific tokenizers, or a portion thereof, by accessing another component of the low-latency data analysis system 3000 that implements the respective grammar-specific tokenizer, or a portion thereof. For example, the natural language processing unit 3710 may implement the natural language tokenizer and the relational analysis unit 3700 may access the natural language processing unit 3710 to implement natural language tokenization. In another example, the semantic interface unit 3600, the distributed in-memory database, or both, may implement a tokenizer for a grammar for the defined structured query language compatible with or implemented by the distributed in-memory database. In some implementations, the low-latency data analysis system 3000, such as the semantic interface unit 3600, may implement a tokenizer for a grammar for a defined structured query language compatible with or implemented by an external database.

A tokenizer, such as the data-analytics tokenizer, may parse text or string data (request string), such as string data included in a data expressing usage intent, in a defined read order, such as from left to right, such as on a character-by-character or symbol-by-symbol basis. For example, a request string may include a single character, symbol, or letter, and tokenization may include identifying one or more tokens matching, or partially matching, the input character.

Tokenization may include parsing the request string to identify one or more words or phrases. For example, the request string may include a sequence of characters, symbols, or letters, and tokenization may include parsing the sequence of characters in a defined order, such as from left to right, to identify distinct words or terms and identifying one or more tokens matching the respective words. In some implementations, word or phrase parsing may be based on one or more of a set of defined delimiters, such as a whitespace character, a punctuation character, or a mathematical operator.

The relational analysis unit 3700 may traverse one or more of the indexes to identify one or more tokens corresponding to a character, word, or phrase identified in request string. Tokenization may include identifying multiple candidate tokens matching a character, word, or phrase identified in request string. Candidate tokens may be ranked or ordered, such as based on probabilistic utility.

Tokenization may include match-length maximization. Match-length maximization may include ranking or ordering candidate matching tokens in descending magnitude order. For example, the longest candidate token, having the largest cardinality of characters or symbols, matching the request string, or a portion thereof, may be the highest ranked candidate token. For example, the request string may include a sequence of words or a semantic phrase, and tokenization may include identifying one or more tokens matching the input semantic phrase. In another example, the request string may include a sequence of phrases, and tokenization may include identifying one or more tokens matching the input word sequence. In some implementations, tokenization may include identifying the highest ranked candidate token for a portion of the request string as a resolved token for the portion of the request string.

The relational analysis unit 3700 may implement one or more finite state machines. For example, tokenization may include using one or more finite state machines. A finite state machine may model or represent a defined set of states and a defined set of transitions between the states. A state may represent a condition of the system represented by the finite state machine at a defined temporal point. A finite state machine may transition from a state (current state) to a subsequent state in response to input (e.g., input to the finite state machine). A transition may define one or more actions or operations that the relational analysis unit 3700 may implement. One or more of the finite state machines may be non-deterministic, such that the finite state machine may transition from a state to zero or more subsequent states.

The relational analysis unit 3700 may generate, instantiate, or operate a tokenization finite state machine, which may represent the respective tokenization grammar. Generating, instantiating, or operating a finite state machine may include operating a finite state machine traverser for traversing the finite state machine. Instantiating the tokenization finite state machine may include entering an empty state, indicating the absence of received input. The relational analysis unit 3700 may initiate or execute an operation, such as an entry operation, corresponding to the empty state in response to entering the empty state. Subsequently, the relational analysis unit 3700 may receive input data, and the tokenization finite state machine may transition from the empty state to a state corresponding to the received input data. In some embodiments, the relational analysis unit 3700 may initiate one or more data-queries in response to transitioning to or from a respective state of a finite state machine. In the tokenization finite state machine, a state may represent a possible next token in the request string. The tokenization finite state machine may transition between states based on one or more defined transition weights, which may indicate a probability of transiting from a state to a subsequent state.

The tokenization finite state machine may determine tokenization based on probabilistic path utility. Probabilistic path utility may rank or order multiple candidate traversal paths for traversing the tokenization finite state machine based on the request string. The candidate paths may be ranked or ordered based on one or more defined probabilistic path utility metrics, which may be evaluated in a defined sequence. For example, the tokenization finite state machine may determine probabilistic path utility by evaluating the weights of the respective candidate transition paths, the lengths of the respective candidate transition paths, or a combination thereof. In some implementations, the weights of the respective candidate transition paths may be evaluated with high priority relative to the lengths of the respective candidate transition paths.

In some implementations, one or more transition paths evaluated by the tokenization finite state machine may include a bound state such that the candidate tokens available for tokenization of a portion of the request string may be limited based on the tokenization of a previously tokenized portion of the request string.

Tokenization may include matching a portion of the request string to one or more token types, such as a constant token type, a column name token type, a value token type, a control-word token type, a date value token type, a string value token type, or any other token type defined by the low-latency data analysis system 3000. A constant token type may be a fixed, or invariant, token type, such as a numeric value. A column name token type may correspond with a name of a column in the data model. A value token type may correspond with an indexed data value. A control-word token type may correspond with a defined set of control-words. A date value token type may be similar to a control-word token type and may correspond with a defined set of control-words for describing temporal information. A string value token type may correspond with an unindexed value.

Token matching may include ordering or weighting candidate token matches based on one or more token matching metrics. Token matching metrics may include whether a candidate match is within a defined data scope, such as a defined set of tables, wherein a candidate match outside the defined data scope (out-of-scope) may be ordered or weighted lower than a candidate match within the define data scope (in-scope). Token matching metrics may include whether, or the degree to which, a candidate match increases query complexity, such as by spanning multiple roots, wherein a candidate match that increases complexity may be ordered or weighted lower than a candidate match that does not increase complexity or increases complexity to a lesser extent. Token matching metrics may include whether the candidate match is an exact match or a partial match, wherein a candidate match that is a partial may be ordered or weighted lower than a candidate match that is an exact match. In some implementations, the cardinality of the set of partial matches may be limited to a defined value.

Token matching metrics may include a token score (TokenScore), wherein a candidate match with a relatively low token score may be ordered or weighted lower than a candidate match with a relatively high token score. The token score for a candidate match may be determined based one or more token scoring metrics. The token scoring metrics may include a finite state machine transition weight metric (FSMScore), wherein a weight of transitioning from a current state of the tokenization finite state machine to a state indicating a candidate matching token is the finite state machine transition weight metric. The token scoring metrics may include a cardinality penalty metric (CardinalityScore), wherein a cardinality of values (e.g., unique values) corresponding to the candidate matching token is used as a penalty metric (inverse cardinality), which may reduce the token score. The token scoring metrics may include an index utility metric (IndexScore), wherein a defined utility value, such as one, associated with an object, such as a column wherein the matching token represents the column or a value from the column, is the index utility metric. In some implementations, the defined utility values may be configured, such as in response to user input, on a per object (e.g., per column) basis. The token scoring metrics may include a usage metric (UBRScore). The usage metric may be determined based on a usage based ranking index, one or more usage ranking metrics, or a combination thereof. Determining the usage metric (UBRScore) may include determining a usage boost value (UBRBoost). The token score may be determined based on a defined combination of token scoring metrics. For example, determining the token score may be expressed as the following:

TokenScore=$FSM$Score*(IndexScore+ $UBR$Score*$UBR$Boost)+Min (CardinalityScore, 1).

Token matching may include grouping candidate token matches by match type, ranking or ordering on a per-match type basis based on token score, and ranking or ordering the match types. For example, the match types may include a first match type for exact matches (having the highest match type priority order), a second match type for prefix matches on ontological data (having a match type priority order lower than the first match type), a third match type for substring matches on ontological data and prefix matches on data values (having a match type priority order lower than the second match type), a fourth match type for substring matches on data values (having a match type priority order lower than the third match type), and a fifth match type for matches omitted from the first through fourth match types (having a match type priority order lower than the fourth match type). Other match types and match type orders may be used.

Tokenization may include ambiguity resolution. Ambiguity resolution may include token ambiguity resolution, join-path ambiguity resolution, or both. In some implementations, ambiguity resolution may cease tokenization in response to the identification of an automatic ambiguity resolution error or failure.

Token ambiguity may correspond with identifying two or more exactly matching candidate matching tokens. Token ambiguity resolution may be based on one or more token ambiguity resolution metrics. The token ambiguity resolution metrics may include using available previously resolved token matching or binding data and token ambiguity may be resolved in favor of available previously resolved token matching or binding data, other relevant tokens resolved from the request string, or both. The token ambiguity resolution may include resolving token ambiguity in favor of integer constants. The token ambiguity resolution may include resolving token ambiguity in favor of control-words, such as for tokens at the end of a request for data, such as last, that are not being edited.

Join-path ambiguity may correspond with identifying matching tokens having two or more candidate join paths. Join-path ambiguity resolution may be based on one or more join-path ambiguity resolution metrics. The join-path ambiguity resolution metrics may include using available previously resolved join-path binding data and join-path ambiguity may be resolved in favor of available previously resolved join-paths. The join-path ambiguity resolution may include favoring join paths that include in-scope objects over join paths that include out-of-scope objects. The join-path ambiguity resolution metrics may include a complexity minimization metric, which may favor a join path that omits or avoids increasing complexity over join paths that increase complexity, such as a join path that may introduce a chasm trap.

The relational analysis unit 3700 may identify a resolved-request based on the request string. The resolved-request, which may be database and visualization agnostic, may be expressed or communicated as an ordered sequence of tokens representing the request for data indicated by the request string. The relational analysis unit 3700 may instantiate, or generate, one or more resolved-request objects. For example, the relational analysis unit 3700 may create or store a resolved-request object corresponding to the resolved-request in the distributed in-memory ontology unit 3500. The relational analysis unit 3700 may transmit, send, or otherwise make available, the resolved-request to the semantic interface unit 3600.

In some implementations, the relational analysis unit 3700 may transmit, send, or otherwise make available, one or more resolved-requests, or portions thereof, to the semantic interface unit 3600 in response to finite state machine transitions. For example, the relational analysis unit 3700 may instantiate a data-analysis object in response to a first transition of a finite state machine. The relational analysis unit 3700 may include a first data-analysis object instruction in the data-analysis object in response to a second transition of the finite state machine. The relational analysis unit 3700 may send the data-analysis object including the first data-analysis object instruction to the semantic interface unit 3600 in response to the second transition of the finite state machine. The relational analysis unit 3700 may include a second data-analysis object instruction in the data-analysis object in response to a third transition of the finite state machine. The relational analysis unit 3700 may send the data-analysis object including the data-analysis object instruction, or a combination of the first data-analysis object instruction and the second data-analysis object instruction, to the semantic interface unit 3600 in response to the third transition of the finite state machine. The data-analysis object instructions may be represented using any annotation, instruction, text, message, list, pseudo-code, comment, or the like, or any combination thereof that may be converted, transcoded, or translated into structured data-analysis instructions for accessing, retrieving, analyzing, or a combination thereof, data from the low-latency data, which may include generating data based on the low-latency data.

The relational analysis unit 3700 may provide an interface to permit the creation of user-defined syntax. For example, a user may associate a string with one or more tokens. Accordingly, when the string is entered, the pre-associated tokens are returned in lieu of searching for tokens to match the input.

The relational analysis unit 3700 may include a localization unit (not expressly shown). The localization, globalization, regionalization, or internationalization, unit may obtain source data expressed in accordance with a source expressive-form and may output destination data representing the source data, or a portion thereof, and expressed using a destination expressive-form. The data expressive-forms, such as the source expressive-form and the destination expressive-form, may include regional or customary forms of expression, such as numeric expression, temporal expression, currency expression, alphabets, natural-language elements, measurements, or the like. For example, the source expressive-form may be expressed using a canonical-form, which may include using a natural-language, which may be based on English, and the destination expressive-form may be expressed using a locale-specific form, which may include using another natural-language, which may be a natural-language that differs from the canonical-language. In another example, the destination expressive-form and the source expressive-form may be locale-specific expressive-forms and outputting the destination expressive-form representation of the source expressive-form data may include obtaining a canonical-form representation of the source expressive-form data and obtaining the destination expressive-form representation based on the canonical-form representation. Although, for simplicity and clarity, the grammars described herein, such as the data-analytics grammar and the natural language search grammar, are described with relation to the canonical expressive-form, the implementation of the respective grammars, or portions thereof, described herein may implement locale-specific expressive-forms. For example, the data-analytics tokenizer may include multiple locale-specific data-analytics tokenizers.

The natural language processing unit 3710 may receive input data including a natural language string, such as a natural language string generated in accordance with user input. The natural language string may represent a data request expressed in an unrestricted natural language form, for which data identified or obtained prior to, or in conjunction with, receiving the natural language string by the natural language processing unit 3710 indicating the semantic structure, correlation to the low-latency data analysis system 3000, or both, for at least a portion of the natural language string is unavailable or incomplete. Although not shown separately in FIG. 3, in some implementations, the natural language string may be generated or determined based on processing an analog signal, or a digital representation thereof, such as an audio stream or recording or a video stream or recording, which may include using speech-to-text conversion.

The natural language processing unit 3710 may analyze, process, or evaluate the natural language string, or a portion thereof, to generate or determine the semantic structure, correlation to the low-latency data analysis system 3000, or both, for at least a portion of the natural language string. For example, the natural language processing unit 3710 may identify one or more words or terms in the natural language string and may correlate the identified words to tokens defined in the low-latency data analysis system 3000. In another example, the natural language processing unit 3710 may identify a semantic structure for the natural language string, or a portion thereof. In another example, the natural language processing unit 3710 may identify a probabilistic intent for the natural language string, or a portion thereof, which may correspond to an operative feature of the low-latency data analysis system 3000, such as retrieving data from the internal data, analyzing data the internal data, or modifying the internal data.

The natural language processing unit 3710 may send, transmit, or otherwise communicate request data indicating the tokens, relationships, semantic data, probabilistic intent, or a combination thereof or one or more portions thereof, identified based on a natural language string to the relational analysis unit 3700.

The data utility unit 3720 may receive, process, and maintain user-agnostic utility data, such as system configuration data, user-specific utility data, such as utilization data, or both user-agnostic and user-specific utility data. The utility data may indicate whether a data portion, such as a column, a record, an insight, or any other data portion, has high utility or low utility within the system, such as among the users of the system. For example, the utility data may indicate that a defined column is a high-utility column or a low-utility column. The data utility unit 3720 may store the utility data, such as using the low-latency data structure. For example, in response to a user using, or accessing, a data portion, data utility unit 3720 may store utility data indicating the usage, or access, event for the data portion, which may include incrementing a usage event counter associated with the data portion. In some embodiments, the data utility unit 3720 may receive the information indicating the usage, or access, event for the data portion from the insight unit 3730, and the usage, or access, event for the data portion may indicate that the usage is associated with an insight.

As used herein, the term "utility" refers to a computer accessible data value, or values, representative of the usefulness of an aspect of the low-latency data analysis system, such as a data portion, an object, or a component of the low-latency data analysis system with respect to improving the efficiency, accuracy, or both, of the low-latency data analysis system. Unless otherwise expressly indicated, or otherwise clear from context, utility is relative within a defined data-domain or scope. For example, the utility of an object with respect to a user may be high relative to the utility of other objects with respect to the user. Express utility indicates expressly specified, defined, or configured utility, such as user or system defined utility. Probabilistic utility indicates utility calculated or determined using utility data and expresses a statistical probability of usefulness for a respective aspect of the low-latency data analysis system. Unless otherwise expressly indicated, or otherwise clear from context, utility is access-context specific. For example, the utility of an object with respect to the access-context of a user may be high relative to the utility of the object with respect to the respective access-contexts of other users.

The data utility unit 3720 may receive a signal, message, or other communication, indicating a request for utility information. The request for utility information may indicate an object or data portion. The data utility unit 3720 may determine, identify, or obtain utility data associated with the identified object or data portion. The data utility unit 3720 may generate and send utility response data responsive to the request that may indicate the utility data associated with the identified object or data portion.

The data utility unit 3720 may generate, maintain, operate, or a combination thereof, one or more indexes, such as one or more of a usage (or utility) index, a resolved-request index, or a phrase index, based on the low-latency data stored in the distributed in-memory database 3300, the low-latency data analysis system 3000, or both.

The insight unit 3730 may automatically identify one or more insights, which may be data other than data expressly requested by a user, and which may be identified and prioritized, or both, based on probabilistic utility.

The object search unit 3800 may generate, maintain, operate, or a combination thereof, one or more object-indexes, which may be based on the analytical-objects represented in the low-latency data analysis system 3000, or a portion thereof, such as pinboards, answers, and worksheets. An object-index may be a defined data structure, or combination of data structures, for storing analytical-object data in a form optimized for searching. Although shown as a single unit in FIG. 3, the object search unit 3800 may interface with a distinct, separate, object indexing unit (not expressly shown).

The object search unit 3800 may include an object-index population interface, an object-index search interface, or both. The object-index population interface may obtain and store, load, or populate analytical-object data, or a portion thereof, in the object-indexes. The object-index search interface may efficiently access or retrieve analytical-object data from the object-indexes such as by searching or traversing the object-indexes, or one or more portions thereof. In some implementations, the object-index population interface, or a portion thereof, may be a distinct, independent unit.

The object-index population interface may populate, update, or both the object-indexes, such as periodically, such as in accordance with a defined temporal period, such as thirty minutes. Populating, or updating, the object-indexes may include obtaining object indexing data for indexing the analytical-objects represented in the low-latency data analysis system 3000. For example, the object-index population interface may obtain the analytical-object indexing data, such as from the distributed in-memory ontology unit 3500. Populating, or updating, the object-indexes may include generating or creating an indexing data structure representing an object. The indexing data structure for representing an object may differ from the data structure used for representing the object in other components of the low-latency data analysis system 3000, such as in the distributed in-memory ontology unit 3500.

The object indexing data for an analytical-object may be a subset of the object data for the analytical-object. The object indexing data for an analytical-object may include an object identifier for the analytical-object uniquely identifying the analytical-object in the low-latency data analysis system 3000, or in a defined data-domain within the low-latency data analysis system 3000. The low-latency data analysis system 3000 may uniquely, unambiguously, distinguish an object from other objects based on the object identifier associated with the object. The object indexing data for an analytical-object may include data non-uniquely identifying the object. The low-latency data analysis system 3000 may identify one or more analytical-objects based on the non-uniquely identifying data associated with the respective objects, or one or more portions thereof. In some implementations, an object identifier may be an ordered combination of non-uniquely identifying object data that, as expressed in the ordered combination, is uniquely identifying. The low-latency data analysis system 3000 may enforce the uniqueness of the object identifiers.

Populating, or updating, the object-indexes may include indexing the analytical-object by including or storing the object indexing data in the object-indexes. For example, the object indexing data may include data for an analytical-object, the object-indexes may omit data for the analytical-object, and the object-index population interface may include or store the object indexing data in an object-index. In another example, the object indexing data may include data for an analytical-object, the object-indexes may include data for the analytical-object, and the object-index population interface may update the object indexing data for the analytical-object in the object-indexes in accordance with the object indexing data.

Populating, or updating, the object-indexes may include obtaining object utility data for the analytical-objects represented in the low-latency data analysis system 3000. For example, the object-index population interface may obtain the object utility data, such as from the object utility unit 3810. The object-index population interface may include the object utility data in the object-indexes in association with the corresponding objects.

In some implementations, the object-index population interface may receive, obtain, or otherwise access the object utility data from a distinct, independent, object utility data population unit, which may read, obtain, or otherwise access object utility data from the object utility unit 3810 and may send, transmit, or otherwise provide, the object utility data to the object search unit 3800. The object utility data population unit may send, transmit, or otherwise provide, the object utility data to the object search unit 3800 periodically, such as in accordance with a defined temporal period, such as thirty minutes.

The object-index search interface may receive, access, or otherwise obtain data expressing usage intent with respect to the low-latency data analysis system 3000, which may represent a request to access data in the low-latency data analysis system 3000, which may represent a request to access one or more analytical-objects represented in the low-latency data analysis system 3000. The object-index search interface may generate one or more object-index queries based on the data expressing usage intent. The object-index search interface may send, transmit, or otherwise make available the object-index queries to one or more of the object-indexes.

The object-index search interface may receive, obtain, or otherwise access object search results data indicating one or more analytical-objects identified by searching or traversing the object-indexes in accordance with the object-index queries. The object-index search interface may sort or rank the object search results data based on probabilistic utility in accordance with the object utility data for the analytical-objects in the object search results data. In some implementations, the object-index search interface may include one or more object search ranking metrics with the object-index queries and may receive the object search results data sorted or ranked based on probabilistic utility in accordance with the object utility data for the objects in the object search results data and in accordance with the object search ranking metrics.

For example, the data expressing usage intent may include a user identifier, and the object search results data may include object search results data sorted or ranked based on probabilistic utility for the user. In another example, the data expressing usage intent may include a user identifier and one or more search terms, and the object search results data may include object search results data sorted or ranked based on probabilistic utility for the user identified by searching or traversing the object-indexes in accordance with the search terms.

The object-index search interface may generate and send, transmit, or otherwise make available the sorted or ranked object search results data to another component of the low-latency data analysis system 3000, such as for further processing and display to the user.

The object utility unit 3810 may receive, process, and maintain user-specific object utility data for objects represented in the low-latency data analysis system 3000. The user-specific object utility data may indicate whether an object has high utility or low utility for the user.

The object utility unit 3810 may store the user-specific object utility data, such as on a per-object basis, a per-activity basis, or both. For example, in response to data indicating an object access activity, such as a user using, viewing, or otherwise accessing, an object, the object utility unit 3810 may store user-specific object utility data indicating the object access activity for the object, which may include incrementing an object access activity counter associated with the object, which may be a user-specific object access activity counter. In another example, in response to data indicating an object storage activity, such as a user storing an object, the object utility unit 3810 may store user-specific object utility data indicating the object storage activity for the object, which may include incrementing a storage activity counter associated with the object, which may be a user-specific object storage activity counter. The user-specific object utility data may include temporal information, such as a temporal location identifier associated with the object activity. Other information associated with the object activity may be included in the object utility data.

The object utility unit 3810 may receive a signal, message, or other communication, indicating a request for object utility information. The request for object utility information may indicate one or more objects, one or more users, one or more activities, temporal information, or a combination thereof. The request for object utility information may indicate a request for object utility data, object utility counter data, or both.

The object utility unit 3810 may determine, identify, or obtain object utility data in accordance with the request for object utility information. The object utility unit 3810 may generate and send object utility response data responsive to the request that may indicate the object utility data, or a portion thereof, in accordance with the request for object utility information.

For example, a request for object utility information may indicate a user, an object, temporal information, such as information indicating a temporal span, and an object activity, such as the object access activity. The request for object utility information may indicate a request for object utility counter data. The object utility unit 3810 may determine, identify, or obtain object utility counter data associated with the user, the object, and the object activity having a temporal location within the temporal span, and the object utility unit 3810 may generate and send object utility response data including the identified object utility counter data.

In some implementations, a request for object utility information may indicate multiple users, or may omit indicating a user, and the object utility unit 3810 may identify user-agnostic object utility data aggregating the user-specific object utility data. In some implementations, a request for object utility information may indicate multiple objects, may omit indicating an object, or may indicate an object type, such as answer, pinboard, or worksheet, and the object utility unit 3810 may identify the object utility data by aggregating the object utility data for multiple objects in accordance with the request. Other object utility aggregations may be used.

The system configuration unit 3820 implement or apply one or more low-latency data analysis system configurations to enable, disable, or configure one or more operative features of the low-latency data analysis system 3000. The system configuration unit 3820 may store data representing or defining the one or more low-latency data analysis system configurations. The system configuration unit 3820 may receive signals or messages indicating input data, such as input data generated via a system access interface, such as a user interface, for accessing or modifying the low-latency data analysis system configurations. The system configuration unit 3820 may generate, modify, delete, or otherwise maintain the low-latency data analysis system configurations, such as in response to the input data. The system configuration unit 3820 may generate or determine output data, and may output the output data, for a system access interface, or a portion or portions thereof, for the low-latency data analysis system configurations, such as for presenting a user interface for the low-latency data analysis system configurations. Although not shown in FIG. 3, the system configuration unit 3820 may communicate with a repository, such as an external centralized repository, of low-latency data analysis system configurations; the system configuration unit 3820 may receive one or more low-latency data analysis system configurations from the repository, and may control or configure one or more operative features of the low-latency data analysis system 3000 in response to receiving one or more low-latency data analysis system configurations from the repository.

The user customization unit 3830 may receive, process, and maintain user-specific utility data, user defined configuration data, user defined preference data, or a combination thereof. The user-specific utility data may indicate whether a data portion, such as a column, a record, autonomous-analysis data, or any other data portion or object, has high utility or low utility to an identified user. For example, the user-specific utility data may indicate that a defined column is a high-utility column or a low-utility column. The user customization unit 3830 may store the user-specific utility data, such as using the low-latency data structure. The user-specific utility data may include, feedback data, such as feedback indicating user input expressly describing or representing the utility of a data portion or object in response to utilization of the data portion or object, such as positive feedback indicating high utility or negative feedback indicating low utility. The user customization unit 3830 may store the feedback in association with a user identifier. The user customization unit 3830 may store the feedback in association with the access-context in which feedback was obtained. The user customization data, or a portion thereof, may be stored in an in-memory storage unit of the low-latency data analysis system. In some implementations, the user customization data, or a portion thereof, may be stored in the persistent storage unit 3930.

The system access interface unit 3900 may interface with, or communicate with, a system access unit (not shown in FIG. 3), which may be a client device, a user device, or another external device or system, or a combination thereof, to provide access to the internal data, features of the low-latency data analysis system 3000, or a combination thereof. For example, the system access interface unit 3900 may receive signals, message, or other communications representing interactions with the internal data, such as data expressing usage intent and may output response messages, signals, or other communications responsive to the received requests.

The system access interface unit 3900 may generate data for presenting a user interface, or one or more portions thereof, for the low-latency data analysis system 3000. For example, the system access interface unit 3900 may generate instructions for rendering, or otherwise presenting, the user interface, or one or more portions thereof and may transmit, or otherwise make available, the instructions for rendering, or otherwise presenting, the user interface, or one or more portions thereof to the system access unit, for presentation to a user of the system access unit. For example, the system access unit may present the user interface via a web browser or a web application and the instructions may be in the form of HTML, JavaScript, or the like.

In an example, the system access interface unit 3900 may include a data-analytics field user interface element in the user interface. The data-analytics field user interface element may be an unstructured string user input element or field. The system access unit may display the unstructured string user input element. The system access unit may receive input data, such as user input data, corresponding to the unstructured string user input element. The system access unit may transmit, or otherwise make available, the unstructured string user input to the system access interface unit 3900. The user interface may include other user interface elements and the system access unit may transmit, or otherwise make available, other user input data to the system access interface unit 3900.

The system access interface unit 3900 may obtain the user input data, such as the unstructured string, from the system access unit. The system access interface unit 3900 may transmit, or otherwise make available, the user input data to one or more of the other components of the low-latency data analysis system 3000.

In some embodiments, the system access interface unit 3900 may obtain the unstructured string user input as a sequence of individual characters or symbols, and the system access interface unit 3900 may sequentially transmit, or otherwise make available, individual or groups of characters or symbols of the user input data to one or more of the other components of the low-latency data analysis system 3000.

In some embodiments, system access interface unit 3900 may obtain the unstructured string user input may as a sequence of individual characters or symbols, the system access interface unit 3900 may aggregate the sequence of individual characters or symbols, and may sequentially transmit, or otherwise make available, a current aggregation of the received user input data to one or more of the other components of the low-latency data analysis system 3000, in response to receiving respective characters or symbols from the sequence, such as on a per-character or per-symbol basis.

The real-time collaboration unit 3910 may receive signals or messages representing input received in accordance with multiple users, or multiple system access devices, associated with a collaboration context or session, may output data, such as visualizations, generated or determined by the low-latency data analysis system 3000 to multiple users associated with the collaboration context or session, or both. The real-time collaboration unit 3910 may receive signals or messages representing input received in accordance with one or more users indicating a request to establish a collaboration context or session, and may generate, maintain, or modify collaboration data representing the collaboration context or session, such as a collaboration session identifier. The real-time collaboration unit 3910 may receive signals or messages representing input received in accordance with one or more users indicating a request to participate in, or otherwise associate with, a currently active collaboration context or session, and may associate the one or more users with the currently active collaboration context or session. In some implementations, the input, output, or both, of the real-time collaboration unit 3910 may include synchronization data, such as temporal data, that may be used to maintain synchronization, with respect to the collaboration context or session, among the low-latency data analysis system 3000 and one or more system access devices associated with, or otherwise accessing, the collaboration context or session.

The third-party integration unit 3920 may include an electronic communication interface, such as an application programming interface (API), for interfacing or communicating between an external, such as third-party, application or system, and the low-latency data analysis system 3000. For example, the third-party integration unit 3920 may include an electronic communication interface to transfer data between the low-latency data analysis system 3000 and one or more external applications or systems, such as by importing data into the low-latency data analysis system 3000 from the external applications or systems or exporting data from the low-latency data analysis system 3000 to the external applications or systems. For example, the third-party integration unit 3920 may include an electronic communication interface for electronic communication with an external exchange, transfer, load (ETL) system, which may import data into the low-latency data analysis system 3000 from an external data source or may export data from the low-latency data analysis system 3000 to an external data repository. In another example, the third-party integration unit 3920 may include an electronic communication interface for electronic communication with external machine learning analysis software, which may export data from the low-latency data analysis system 3000 to the external machine learning analysis software and may import data into the low-latency data analysis system 3000 from the external machine learning analysis software. The third-party integration unit 3920 may transfer data independent of, or in conjunction with, the system access interface unit 3900, the enterprise data interface unit 3400, or both.

The persistent storage unit 3930 may include an interface for storing data on, accessing data from, or both, one or more persistent data storage devices or systems. For example, the persistent storage unit 3930 may include one or more persistent data storage devices, such as the static memory 1200 shown in FIG. 1. Although shown as a single unit in FIG. 3, the persistent storage unit 3930 may include multiple components, such as in a distributed or clustered configuration. The persistent storage unit 3930 may include one or more internal interfaces, such as electronic communication or application programming interfaces, for receiving data from, sending data to, or both other components of the low-latency data analysis system 3000. The persistent storage unit 3930 may include one or more external interfaces, such as electronic communication or application programming interfaces, for receiving data from, sending data to, or both, one or more external systems or devices, such as an external persistent storage system. For example, the persistent storage unit 3930 may include an internal interface for obtaining key-value tuple data from other components of the low-latency data analysis system 3000, an external interface for sending the key-value tuple data to, or storing the key-value tuple data on, an external persistent storage system, an external interface for obtaining, or otherwise accessing, the key-value tuple data from the external persistent storage system, and an internal key-value tuple data for sending, or otherwise making available, the key-value tuple data to other components of the low-latency data analysis system 3000. In another example, the persistent storage unit 3930 may include a first external interface for storing data on, or obtaining data from, a first external persistent storage system, and a second external interface for storing data on, or obtaining data from, a second external persistent storage system.

Figure 4:
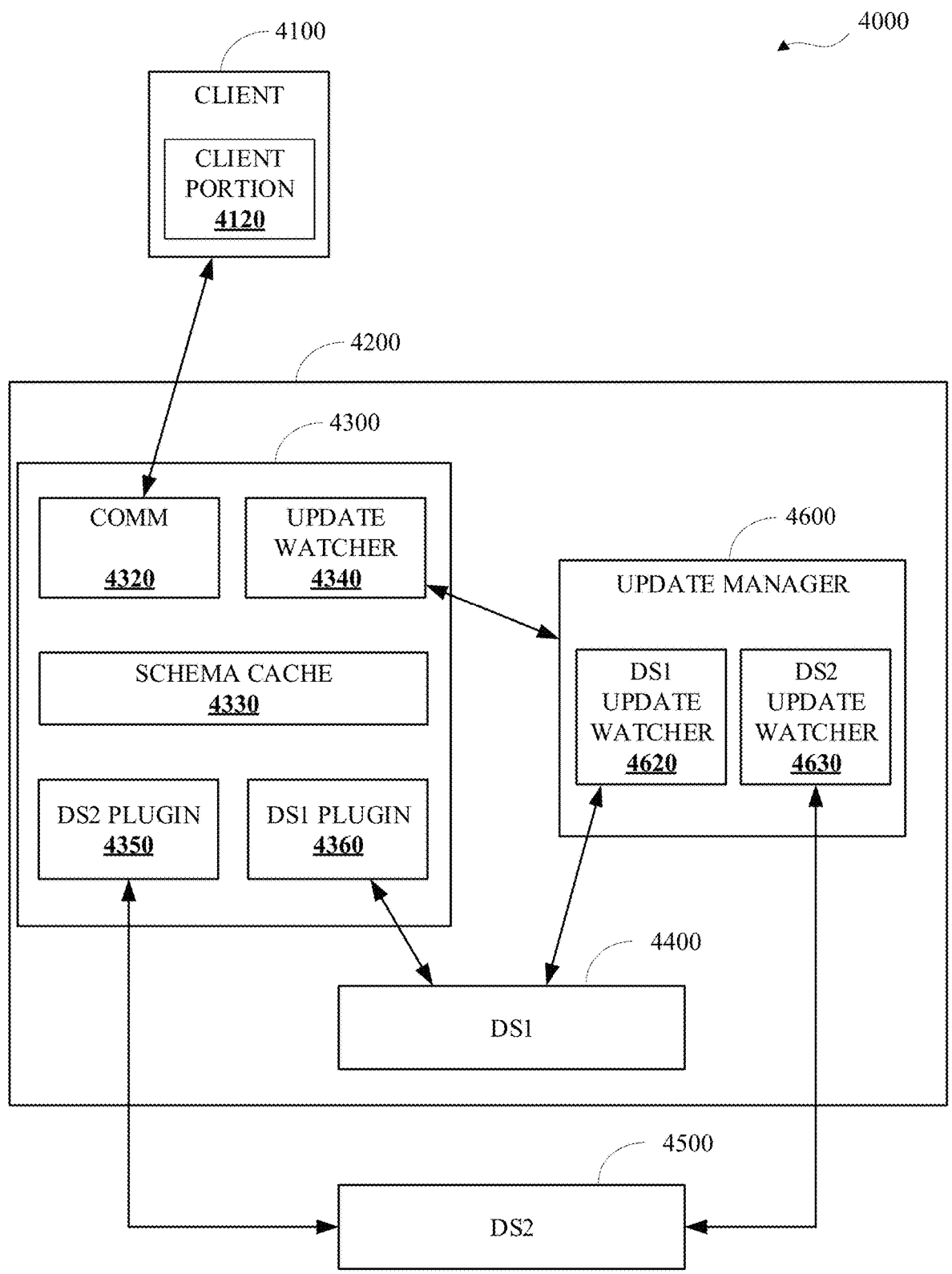
FIG. 4 is a block diagram of an example of a system 4000 for database command execution.

FIG. 4 is a block diagram of an example of a system 4000 for database command execution. The system 4000 includes a client device 4100 and a server device 4200 (i.e., a database command execution device). The system 4000 may include other elements not shown in FIG. 4, such as computer network elements. The system 4000 implements a command execution facility that includes a client portion 4120 and a server portion 4300.

The client device 4100 includes (e.g., performs, executes, etc.) the client portion 4120 of database command execution. The server device 4200 includes (e.g., performs, executes, etc.) the server portion 4300 of database command execution. Each of the client portion 4120 and the server portion 4300 can be implemented, for example, as a respective software program that may be executed by a respective computing device. The software program can include machine-readable instructions that may be stored in a memory of the computing device, and that, when executed by a processor may cause the computing device to perform the respective software program.

The client device 4100 can be the computing device 1000 of FIG. 1, or one of the client devices 2320, 2340 of FIG. 2. The client portion 4120 may be an application, which can be a command-line application or a graphical-user-interface application, that enables a user of the application to formulate and submit database commands to the server portion 4300. The server portion transmits the database commands to data source for execution. In an example, the client portion 4120 can be accessible (e.g., usable, etc.) using a web browser available at the client device 4100. The client portion 4120 receives input from the user and generates database commands based on (e.g., using, etc.) the input from the user. The client device 4100 (e.g., the client portion 4120, the browser, etc.) transmits (such as in response to user commands or instructions to transmit) the database commands to the server device 4200 for execution.

The server device 4200 can be the computing device 1000 of FIG. 1. The server device 4200 can include zero or more data sources (such as a data source 4400), can be in communication with zero or more external data sources (such as a data source 4500), or a combination thereof. While, for simplicity, the server device 4200 is described as being one device, the server device 4200 may be a cluster of virtual or physical devices. A data source can be a database system, an application server, or any other type of system that can receive commands related to data and data schemas.

The data source 4400 can be the internal database analysis portion 2200 of FIG. 2, or aspects thereof, or the low-latency data analysis system 3000 of FIG. 3, or aspects thereof. For example, the data source 4400 can be the distributed in-memory database 3300 of FIG. 3. For example, the data source 4500 can be, can be included in, can be implemented by, or can be similar to an external data source portion, such as the external data source portion 2100 of FIG. 2. In an example, the data source 4500 can receive database commands from the server portion 4300 and provide data that can be used to obtains tokens for use at the client portion 4120.

The network communication between the client device 4100 and the server device 4200 may be secured using any possible secure communication techniques. To illustrate, and without limitations, the client portion 4120 may communicate with a communication component 4320 of the server portion 4300. For example, the client portion 4120 may communicate with the server portion 4300 using the Hypertext Transfer Protocol Secure (HTTPS) protocol. The communication component 4320 can decrypt, prior to processing by the server portion 4300, received encrypted information or requests from the client portion 4120; and encrypt information to be transmitted from the server portion 4300 to the client portion 4120. In an example, the server portion 4300 can be stateless. That is, the server portion 4300 does not retain session state from previous requests received from the client portion 4120. In an example, the server portion 4300 can implement a REpresentational State Transfer (REST)

API that the client portion can use to transmit requests, including database commands, to the server portion 4300.

The client portion 4120 may implement an auto-complete function that can guide (e.g., aid) the user in formulating database execution commands. As mentioned above, the auto-complete function can give the user the option of completing tokens via a shorthand method on the basis of what the user has already typed and, in the case of multiple possible completions, gives the user a list of the possible completions for the user to choose from. The client portion 4120 obtains data from the server portion 4300 that the client portion 4120 can use to provide (e.g., enable) the auto completion.

The client portion 4120 obtains, from the data, tokens that the client portion 4120 uses in the auto completion. In an example, the data obtained from the server portion 4300 can be or can include the tokens. In another example, the client portion 4120 obtains object data from the server portion 4300 and uses the object data to obtain the tokens. Regardless of the data types or structures of data that the client portion 4120 obtains from the server portion 4300, the client portion 4120 can be said to obtain tokens (e.g., a set of tokens) from the server portion 4300.

In an example, the server portion 4300 can obtain the data to be transmitted to the client portion from a data source. In an example, the data source may include an ontology unit, such as the distributed in-memory ontology unit 3500 of FIG. 3, and the server portion 4300 may obtain the data from the ontology unit of the data source. More generally, a database source can include a facility (e.g., a module, a tool, a software, a service, etc.) that can provide data that are or that include ontology, schema, token information, or the like, to the server portion 4300. The facility can provide the data to the server portion in response to a query for the data received from the server portion 4300.

As further described herein, the tokens can be static tokens or dynamic tokens. Static tokens can include, be, or be derived from control-word tokens of the database system. As such, static tokens can be or can correspond to, for example, keywords of a grammar of a data source. The grammar can be that of a language for formulating database commands. In an example, the control-word tokens may be specific to, or obtained from, a data source. In an example, control-word tokens may be included (e.g., may be part of, etc.) the client portion 420. As such, in an example, the client portion 4120 does not obtain control-word tokens from the server portion 4300. For example, the client portion 4120 may include or may implement a defined grammar of a database. Dynamic tokens can include, be, or be derived from ontological tokens of a data source. As such, dynamic tokens can include schema- and database-related tokens (such as database names, table names, column names, and the like). Dynamic tokens can be obtained from an ontological unit of the data source.

In an example, the tokens presented by the auto-completion feature of the client portion 4120 may not depend on the context (i.e., are not contextual or are not context based). To illustrate, and without limitations, assume that a database schema includes an EMPLOYEE table that includes the columns ADDRESS and TITLE, and a CHILD table that includes the columns AGE and NAME. In an example, the client portion 4120 presents to the user all matching tokens. For example, if the user does not provide a partial string, then in response to an auto-completion event, the client portion 4120 may provide to the user the list of token ADDRESS, AGE, CHILD, EMPLOYEE, NAME, and TITLE. As another example, in response to the partial string A*, the client portion 4120 may provide to the user the list of token ADDRESS and AGE.

In an example, the tokens presented can depend on the context (i.e., are contextual or are context based). For example, in response to the partial database command ALTER TABLE EMPLOYEE DROP T*, the client portion 4120 may provide to the user the token TITLE. That is, the client portion 4120 may determine that, according to the grammar of the of the data source, the context of the database command includes the table EMPLOYEE and that following the DROP control-word token, the database command should include a column name of a column of the EMPLOYEE table.

As already mentioned, the server portion 4300 provides a set of tokens to the client portion 4120. In an example, the set of tokens can be the tokens for a specific database of a data source. In an example, the set of tokens can be a union of all tokens for all databases of a data source. In an example, the set of tokens can be a union of all tokens of all databases of all data sources. In an example, the set of tokens can relate to one or more tables of a database of one of the data sources. Other contexts for the set of tokens are possible. The server portion 4300 can obtain the set of tokens from one or more ontology units of the one or more data sources.

The server portion 4300 can include a schema cache 4330, an update watcher 4340, and one or more data-source plugins (such as a data-source plugin 4350 and a data-source plugin 4360). The server portion 4300 may include more or fewer components. The schema cache 4330 can store schema information (e.g., tokens or data from which tokens can be obtained) obtained from a data source via the server portion 4300.

The update watcher 4340 obtains notifications from the update manager 4600 responsive to a schema change or an authorization change in a data source. From the perspective of the user of the client portion 4120, and already mentioned, the schema of a data source may change, such as while the user is using the client portion 4120, due to at least two types of actions. In a first type of action, another user may change to the schema itself (such as by adding a table). The other user may change the schema using an ontology unit of the data source, such as the distributed in-memory ontology unit 3500 of FIG. 3, or the client portion 4120. In a second action, another user may change the access controls (e.g., access privileges) of the objects of the data source therewith changing what schema information the user of has visibility to. In an example, the data source may include a semantic interface unit, such as the semantic interface unit 3600, that may be used by the other user to change the access controls of the ontological data. Schema changes can also result from the database commands issued by the user of the client portion 4120.

In an example, the ontology unit of the data source may associate version information (e.g., a version level) with a current state of schema. When the schema of a database changes (such as when a table is added, a table is deleted, column information is altered, a column is added columns, a column is removed, or the like), the ontology unit may update the version level associated with the final state of the schema after the changes are applied. In an example, version level information may be associated with the schema of a database as a whole. In an example, version level information may be associated with less than the database as a whole. For example, a database may include more than one schema and respective version levels may be associated with each of the schemas. For example, a schema version level may be associated with a table. As such, each schema version level may be associated with each table of the database.

In an example, the semantic interface unit of the data source may associate authorization levels with users authorized to access the data source. In an example, the data source may associate an authorization level with the access control rules of data source as whole. As such, responsive the a change to the access control rules, the semantic interface unit may update the authorization level associated with the access control rules. In an example, an access control level may be associated with, or obtained for, a user.

Responsive to a notification of a schema change or a notification of an authorization change in a data source, the update watcher 4340 can obtain schema updates from the update manager 4600 to update the schema cache 4330 with the latest schema information reflective of schema changes and/or authorization changes.

The update manager 4600 obtains updates regarding schema and authorization from data sources. Responsive to receiving an update regarding a schema and/or an authorization, the update manager 4600 informs (e.g., transmits a notification to, etc.) the update watcher 4340. The update manager 4600 can include data-source watchers and can cause (e.g., issue a request to, etc.) a data-source watcher corresponding to the data source to obtain updated ontological data, or updated data indicative of or derived from, the ontological data from the data source. As such, the update manager 4600 determines whether schema information of a data source and that is available at the server portion 4300 (such in the schema cache 4330) is up to date or not; and if the schema information is not up to date, the update manager 4600 causes the schema cache to be updated by receiving the updated schema information from a data-source watcher corresponding to the data source. Stated another way, the update manager 4600 can continuously watch the data sources (via respective data source update watchers) for schema and authorization updates and maintains the corresponding schema and authorization versions. As further described herein, each data source can provide its own mechanisms regarding schema and/or authorization changes. In an example, the changes may be provided via push-based notifications (e.g., a subscription, a callback, or the like) to the update manager 4600; in another example, the changes may be provided via pull-based polling (e.g., a REST call, an RPC call, or the like) to the update manager 4600. As such, the update manager 4600 can handle data source-specific intricacies while the update watcher 4340 can uniformly handle all data sources.

In an example, the server portion 4300 can include (such as in the update watcher 4340, the schema cache 4330, or some other components) a schema level for a data source. The update watcher 4340 may obtain a new schema level for the data source from the update manager 4600. The update watcher 4340 determines that there is a schema change if the new schema level does not match the schema level included in the server portion 4300. In another example, the update watcher 4340 may simply receive a notification that there is a schema change. In an example, the update watcher 4340 does not receive a schema level from a data source. Rather, responsive to receiving a notification that the schema has changed (i.e., a schema change notification), the server portion 4300 may receive the updated schema as described herein and may update the schema level included in the server portion 4300.

In an example, the server portion 4300 can include (such as in the update watcher 4340, the schema cache 4330, or some other components) an authorization level for a data source, which may be associated with the user of the client portion 4120. The update watcher 4340 may obtain a new authorization level from the update manager 4600. The update watcher 4340 determines that there is an authorization change if the new authorization level does not match the authorization level included in the server portion 4300. In another example, the update watcher 4340 may simply receive a notification that there is an authorization change. In an example, the update watcher 4340 does not receive an authorization level from a data source. Rather, responsive to receiving a notification that the authorization level has changed (i.e., an authorization change notification), the server portion 4300 may receive the updated schema as described herein and may update the authorization level included in the server portion 4300.

A data source may provide one or more services from which a consumer (e.g., an update watcher) can obtain notifications of changes. For example, the data source may provide a schema-change service, an authorization-change service, or both. The schema-change service may be subscription service or a polling service. The authorization-change service may be a subscription service or a polling service. To illustrate, and without limitations, the data source 4400 may include a subscription schema-change service, a subscription authorization-change service, or both; and the data source 4500 may provide a polling schema-change service, a polling authorization-change service, or both.

A data-source update-watcher 4620 may subscribe (e.g., transmit a request to subscribe, register itself, etc.) to the schema-change service of the data source 4400, which notifies the data-source update-watcher 4620 of schema changes in the data source 400. In an example, the data-source update-watcher 4620 may subscribe to receive notifications of changes at different granularities (e.g., levels, etc.) of the schema. To illustrate, the data-source update-watcher 4620 may subscribe to receive notifications regarding schema changes of a database, of a schema, of a table, or of some other granularity of the data source.

The data-source update-watcher 4620 may subscribe to the authorization-change service of the data source 4400, which notifies the data-source update-watcher 4620 of authorization changes. The data-source update-watcher 4620 can include user identification (e.g. a user id) of the user of the client portion 4120 in the subscription request to the authorization-change service. In an example, the data-source update-watcher 4620 may subscribe to receive notifications of authorization changes at different granularities (e.g., levels, etc.) of the schema. To illustrate, the data-source update-watcher 4620 may subscribe to receive notifications regarding authorization changes of a database, of a schema, of a table, or of some other granularity of the data source 4400. Responsive to receiving the notification of the change, the update watcher 4340 may issue, or may cause the data-source update-watcher 4620 to issue, a second request (i.e., an authorization-update request) to obtain the schema changes (e.g., the schema data that the user now has access to or no longer has access to) or to obtain data that the update watcher 4340 can use to update the schema in the schema cache 4330. In an example, the response from the data source 4500 can include an authorization level.

A data-source update-watcher 4630 may transmit schema-change polling requests to the data source 4500. That is, at regular intervals or on demand (e.g., as needed), the data-source update-watcher 4630 can transmit a schema-change polling request to the data source 4500 to inquire whether there has been a schema change since the last request. A response from the data source 4500 may indicate whether there has been a schema change. The update watcher 4340 may issue, or may cause the data-source update-watcher 4630 to issue, a second request (i.e., a schema-update request) to obtain the schema changes or to obtain data that the update watcher 4340 can use to update the schema in the schema cache 4330. In an example, the response from the data source 4500 can include a schema level. The update watcher 4340 may issue, or may cause the data-source update-watcher 4620 to issue, a second request (i.e., a schema-update request) to obtain the schema changes or to obtain data that the update watcher 4340 can use to update the schema in the schema cache 4330. In an example, the response from the data source 4500 can include a schema level.

The data-source update-watcher 4630 may transmit authorization-change polling requests to the data source 4500. That is, at regular intervals or on demand (e.g., as needed), the data-source update-watcher 4630 can transmit an authorization-change polling request to the data source 4500 to inquire whether there has been an authorization change, such as with respect to the user of the client portion 4120, since the last request. A response from the data source 4500 may indicate whether there has been an authorization change. The update watcher 4340 may issue, or may cause the data-source update-watcher 4630 to issue, a second request (i.e., an authorization-update request) to obtain the schema changes (e.g., the schema data that the user now has access to or no longer has access to) or to obtain data that the update watcher 4340 can use to update the schema in the schema cache 4330. In an example, the response from the data source 4500 can include an authorization level.

In an example, the server portion 4300 can include a respective data-source plugin for each data source that the server portion 4300 can communicate with for executing database commands. That is, the server portion 4300 can include a respective data-source plugin for each data source that the server portion 4300 may receive a database command for from the client portion 4120. As two data sources (i.e., the data source 4400 and the data source 4500) are shown in FIG. 4, two respective data-source plugins (i.e., the data-source plugin 4360 and the data-source plugin 4350, respectively) are shown in FIG. 4. However, the disclosure herein is not so limited and the server portion 4300 can include more of fewer data-source plugins. In an example, one plugin may be used with more than one data source. In an example, the data source 4400 can be or can include the distributed in-memory database 3300 of FIG. 3, and the data-source plugin 4360 can be a plugin that can transmit database commands to the distributed in-memory database 3300. A data-source plugin can be, for example, a component that can format a request to a data source and/or communicate with the data source according to the syntax, semantics, an interface, or the like of the data source. As such, for example, the data-source plugin 4360 can receive a database command as received from the client portion 4120, reformat (if necessary) the database command for the data source 4400, and transmit the database command to the data source 4400 using an interface (e.g., an API, etc.) of the data source 4400. The data-source plugin may receive a result of the execution of the database command from the data source and transmit (e.g., handoff, pass, etc.) the results to the server portion 4300.

As further described herein, the client portion 4120 can include at least one of a schema level or an authorization level, currently held by the client portion 4120, in a request to server portion 4300 to execute one or more database commands entered by the user. As mentioned, the corresponding data-source plugin transmits the one or more database commands to the corresponding data source. The server portion 4300 transmits a response to the client portion 4120. The server portion includes in the response transmitted to the client portion 4120, the response, as received from the data source, of the data source executing the one or more commands. The server portion also includes in the response the schema level held by the server portion 4300, if different from the schema level held by the client portion 4120, or the authorization level held by the server portion 4300, if different from the authorization level held by the client portion 4120.

Figure 5:
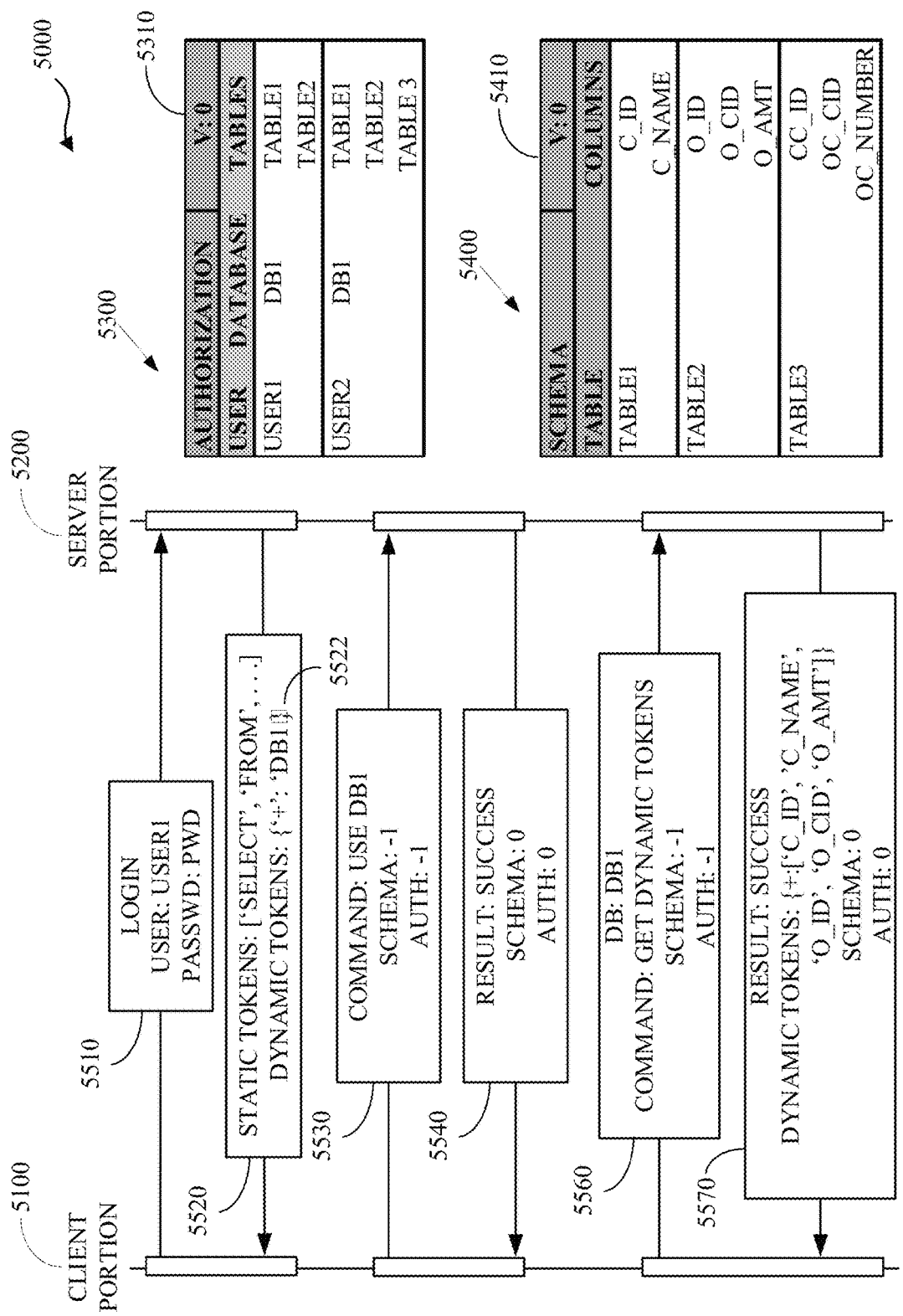
FIG. 5 is an example of an interaction diagram for obtaining an initial set of tokens.

FIG. 5 is an example 5000 of an interaction diagram for obtaining an initial set of tokens. The example 5000 illustrates obtaining the initial set of dynamic tokens as a user (i.e., USER1) establishes a session, using a client portion 5100, with a server portion 5200. The client portion 5100 and the server portion 5200 can be, respectively, the client portion 4120 and the server portion 4300 of FIG. 4. Upon successful authentication, static tokens and dynamic tokens corresponding to database names are transmitted from the server portion 5200 to the client portion 5100 piggybacked with a response from the server portion 5200. Dynamic tokens are transmitted from the server portion 5200 to the client portion 5100 in responses, transmitted to the client portion 5100, to requests received from the client portion 5100.

An authorization state 5300 illustrates at least a portion of a current state (e.g., indications thereof, summaries thereof, etc.) of access controls of ontological data in a data source (not shown), such as the data source 4400 or the data source 4500 of FIG. 4. The authorization state 5300 may be available in the data source. Alternatively, or additionally, the authorization state 5300, a portion thereof, or data similar thereto, that describe or indicate the ontological data that the user can access, may be available at the server portion 5200, such as in the schema cache 4330 of FIG. 4. For example, the server portion 5200 may obtain data from the data source that the server portion 5200 can use to constitute the authorization state 5300, or a portion thereof according to the access controls of the user. The data can be obtained in response to an authorization-update request that the server portion 5200 transmits to the data source. An authorization level 5310 is associated with the authorization state 5300.

A schema state 5400 illustrates at least a portion of a current state (e.g., indications thereof, summaries thereof, etc.) of ontological data in the data source. The schema state 5400 may be available in the data source. Alternatively, or additionally, the schema state 5400 may be available in the server portion 5200, such as in the schema cache 4330 of FIG. 4. For example, the server portion 5200 may obtain data from the data source that the server portion 5200 can use to constitute the schema state 5400, a portion thereof, or data similar thereto. The data can be obtained in response to a schema-update request that the server portion 5200 transmits to the data source. A schema level 5410 is associated with the schema state 5400.

The authorization state 5300 illustrates that the data source includes one database that is named DB1; that the user USER1 is authorized to access the tables named TABLE1 and TABLE2 of DB1; and that a user USER2 is authorized to access the tables named TABLE1, TABLE2, and TABLE3. As can be appreciated, a user may have different access controls (e.g., read, write, delete, or modify) to different ontological data. However, for brevity and to simplify the understanding of this disclosure, a user is said to be either authorized to access to not authorized to access an ontological object.

The schema state 5400 illustrates that TABLE1 includes the columns named C_ID and C_NAME; that TABLE2 includes the columns named O_ID, O_CID, and O_AMT; and that TABLE3 includes the columns named CC_ID, OC_CID, and OC NUMBER.

As such, the tokens of the data source include the dynamic tokens DB1, TABLE1, TABLE2, TABLE3, C_ID, C_NAME, O_ID, O_CID, O_AMT, CC_ID, OC_CID, and OC NUMBER.

At 5510, responsive to the user USER1 providing credential information (e.g., user id=USER1 and password=PWD), the client portion 5100 transmits a request to the server portion 5200 to establish a database command execution session (i.e., a session) with the server portion 5200.

Upon successful authentication of the user USER1, at 5520, the server portion 5200 transmits a response to the client portion 5100. The response can include a session identifier (not shown) that the client portion can include in every subsequent request the server portion 5200 and that the server portion 5200 can use to identify that the subsequent request is being received from USER1. The response also includes static tokens and at least some dynamic tokens of the data source. For example, the static tokens can include the keywords SELECT, FROM, and other keywords. The client portion 5100 can add the static tokens to a set of static tokens.

The dynamic tokens include the database names of the data source. As dynamic tokens may change in the course of the session, and to minimize the amount of information (e.g., token data) transmitted from the server portion 5200 to the client portion 5100, dynamic tokens received from the server portion 5200 can be received in the form of additions and removals. For example, responsive to receiving a datum 5522, the client portion 5100 adds (i.e., responsive to the '+' action of the datum 5522) the dynamic token DB 1 to the set of dynamic tokens available at the client, which may be empty at the start of the session. However, the disclosure herein is not so limited and the dynamic tokens may be received from the server portion 5200 in any format other than as additions and removals.

At 5530, responsive to user input (e.g., USE DB1) that the user intends to issue database commands for the database named DB1, the client portion 5100 transmits, to the server portion 5200, a request that includes the command USE DB1. The server portion 5200 uses the database name provided by the user to limit (e.g., select, etc.) the dynamic tokens that are provided to the client portion 5100. As such, the set of tokens provided to the client portion 5100 can be context sensitive in that the tokens transmitted to the client portion 5100 are those that the user of the client portion 5100 is likely to use and that correspond to the selected database (and tables therein). As is further described herein, tokens corresponding to un-authorized objects (e.g., tables or databases to which the user does not have access) are not transmitted to the client portion 5100. As such, un-authorized objects can be opaque to the user.

The client portion 5100 also includes in the request an indication of the set of dynamic tokens currently available at the client portion 5100. The indication of the set of dynamic tokens can be or include a client-schema level, a client-authorization level, or both. The client-schema level can indicate (e.g., identify, determine, describe, etc.) the dynamic tokens of the schema of the database that are currently (i.e., at the time of the request) available at the client portion 5100. The client-authorization level can indicate the dynamic tokens of the database that the user has access to and that are currently available at the client portion 5100. As such, the client portion 5100 can include in the request the client-schema level, the client-authorization level, or both. At the time that the session is established, the client-schema level and the client-authorization level are unset. For example, the client-schema level and client-authorization level may each be set to (or has) an invalid level (e.g., a value of −1, or some other value). As such, and as shown in FIG. 5, the client portion 5100 includes in the request a current client-schema level indicator (e.g., SCHEMA: −1) and a current client-authorization level indicator (e.g., AUTH: −1) for the database name DB1.

The server portion 5200 may transmit the command USE DB1 to the data source that includes the database named DB1, such as via a data-source plugin, and may receive a response (i.e., a result) of the database command. The server portion 5200 can also transmit an authorization-update request and a schema-update request to obtain data indicative of or to constitute the authorization state 5300 and the schema state 5400, respectively.

At 5540, the server portion 5200 transmits a response to the client portion 5100. The response includes the result (e.g., successful execution or execution failure of the database command) and any of the server-schema level or a server-authorization level that are different from the client-schema level or the client-authorization level, respectively, received at 5530. As such, the server-authorization level (i.e., the authorization level 5310) is included (e.g., AUTH: 0) and the server-schema level (i.e., the schema level 5410) is also included (e.g., SCHEMA: 0) in the response.

Responsive to determining that the server-schema level is different from the client-schema level, the server-authorization level is different from the client-authorization level, or both, at 5560, the client portion 5100 transmits an update-tokens request (e.g., COMMAND: GET DYNAMIC TOKENS) to the server portion 5200. The update-tokens request includes the client-schema level and the client-authorization level. As such, the request includes SCHEMA: −1 and AUTH: −1.

At 5570, the server portion 5200 transmits a set of token differences, in the form of additions and removals, to the set of tokens available at the client portion 5100. As the user USER1 has access to the tables named TABLE1 and TABLE2, the response instructs (via the '+' action) the client portion 5100 to add the tokens C_ID, C_NAME, O_ID, O_CID, and O_AMT. In an example, the response can also include contextual token information to indicate, for example, the table names associated with the column names. To illustrate, and without limitations, the response may include DYNAMIC TOKENS: {+:['TABLE1:C_ID', 'TABLE1:C_NAME', 'TABLE2:O_ID', 'TABLE2:O_CID', 'TABLE2:O_AMT']} or DYNAMIC TOKENS: {+:{'TABLE1':[C_ID', 'C_NAME']}, {'TABLE2[O_ID', 'O_CID', 'O_AMT']}} to indicate the table names (tokens) associated with column name tokens. The response also includes the server-schema level (e.g., SCHEMA: 0) and the server-authorization level (e.g., AUTH: 0). The client portion 5100 updates the client-schema level and the client-authorization level to be the same as the server-schema level (e.g., 0) and the server-authorization level (e.g., 0), respectively.

Additionally, while not specifically shown in FIG. 5, and as described herein, the client portion 5100 can regularly issue update-tokens requests to the server portion 5200.

The client portion 5100 can use the set of tokens now available at the client portion 5100 to aid the user in formulating database commands via the auto-complete function. As such, for example, if the user is not authorized for a database or table, the client portion may not provide auto-completion tokens for the database name, the table name, or the column names of the table as such tokens may not be included in the set of tokens available at the client portion 5100.

Figure 6:
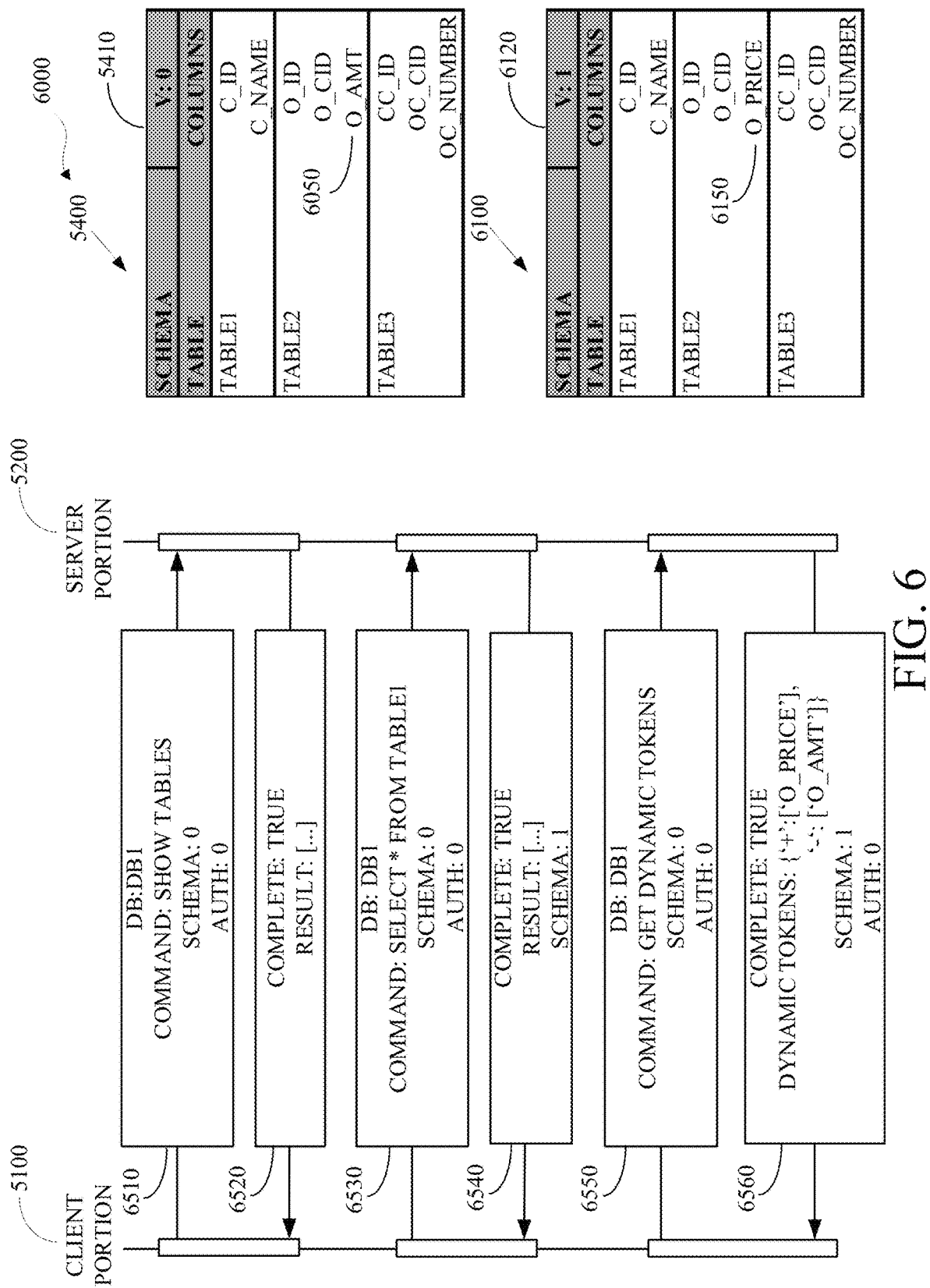
FIG. 6 is an example of an interaction diagram for updating dynamic tokens responsive to a schema change.

FIG. 6 is an example 6000 of an interaction diagram for updating dynamic tokens responsive to a schema change. The example 6000 illustrates a continuation of the session of the user USER1 that is established as described with respect to FIG. 5. As such, the example 6000 includes the client portion 5100, the server portion 5200, and the schema state 5400 of FIG. 5.

In response to user input to execute the database command SHOW TABLES, at 6510, the client portion 5100 transmits a request, including the database command, to the server portion 5200. The request includes the client-schema version (e.g., SCHEMA: 0) and the client-authorization version (e.g., AUTH: 0). At 6520, the server portion 5200, transmits a response that includes a result (e.g., RESULT: [ . . . ]) of the execution of the database command. The ellipsis (i.e., " . . . ") in RESULT: [ . . . ] constitute the result of the execution of the database command, the details of which are not necessary to the understanding of this disclosure and are, therefore, omitted. The server portion 5200 does not include the server-schema level or the server-authorization level in the response because neither is different from the client-schema level or the client-authorization, respectively, included in the request at 6510.

The example 6000 illustrates that at this time, the schema of the data source has changed as shown in updated schema state 6100. As described herein with respect to FIG. 4, the server portion 5200 may have received a notification (as a result of subscribing to, or polling for, schema changes) of the schema change and issued a schema-update request. Whereas the schema state 5400 includes a column 6050 (i.e., the column named O_AMT) in TABLE2, the updated schema state 6100, which has or includes an updated schema level 6120 (i.e., 1), does not include the column 6050 but includes a column 6150 (i.e., the column named O_PRICE) in TABLE2. As such, the server-schema level is now set to the updated schema level 6120 (i.e., 1).

In response to user input to execute the database command SELECT * FROM TABLE1, at 6510, the client portion 5100 transmits a request, including the database command, to the server portion. The request includes the client-schema version (e.g., SCHEMA: 0) and the client-authorization version (e.g., AUTH: 0). The server portion 5200 may transmit the database command to the data source and receive a result of the database command from the data source. At 6540, the server portion 5200 transmits a response to the client portion 5100. The response includes the result of the database command (e.g., RESULT: [ . . . ]) and the client-schema level, which is now set to the updated schema level 6120 (i.e., SCHEMA: 1).

In response to determining that the client-schema level is different from the client-schema level, at 6550, the client portion 5100 transmits an update-tokens request (i.e., COMMAND: GET DYNAMIC TOKENS) and includes the client-schema level (i.e., SCHEMA: 0) and the client-authorization level (i.e., AUTH: 0) in the request.

At 6560, the server portion 5200 transmits a response that includes an indication of the set of tokens available at the server portion. The indication of the set of tokens can be a set of instructions for updating the set of tokens available at the client portion 5100 to match the set of tokens available at the server portion 5200. For example, the instructions include an instruction to add (i.e., "+") the dynamic token (i.e., the column name) O_PRICE and an instruction to remove (i.e., '−') the dynamic token (i.e., the column name) O_AMT from the set of dynamic tokens available at the client portion 5100. As mentioned above, the instructions can have a different format or different semantics. The response also includes at least the client-schema level, which the client portion 5100 can use to update the client-schema level. The response can also include the server-authorization level, which the client portion 5100 can use to update the client-authorization level.

In some situation, the result to be received from the server portion 5200 may be larger than that is feasible to transmit in one response. For example, it many not be feasible to transmit petabytes of data in an HTTP response. In such situations, the server portion 5200 transmits the result, in a streaming manner, in the form of chunks of data. In an example, each chunk can include a batch of result rows from the data source in addition to other information, such as result headers (if any), a chunk number, and whether the chunk is the last chunk.

Figure 7:
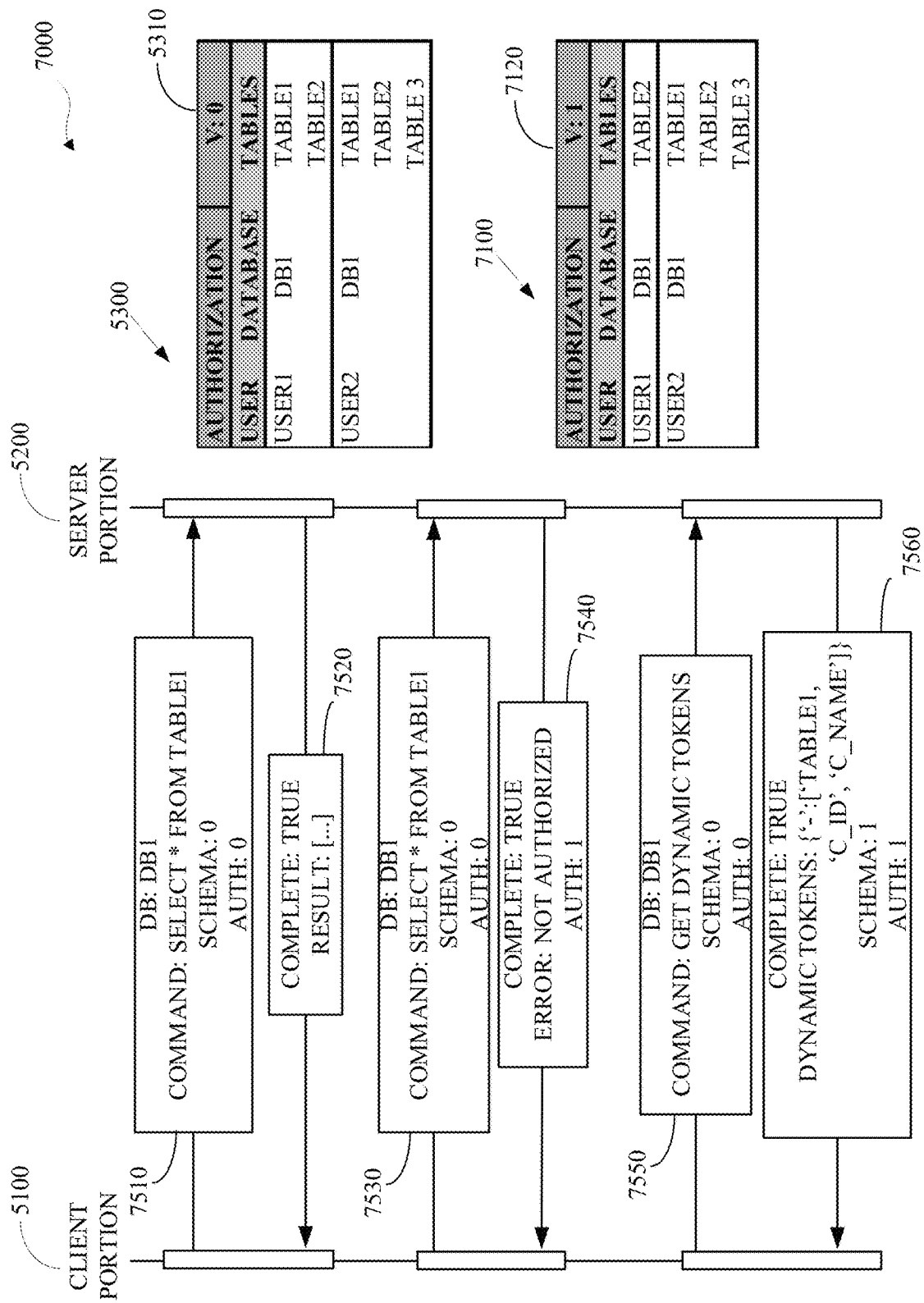
FIG. 7 is an example of an interaction diagram for updating dynamic tokens responsive to an authorization change.

FIG. 7 is an example 7000 of an interaction diagram for updating dynamic tokens responsive to an authorization change. The example 7000 illustrates a continuation of the session of the user USER1 that is established as described with respect to FIG. 5. As such, the example 7000 includes the client portion 5100, the server portion 5200, and the authorization state 5300 of FIG. 5.

In response to user input to execute the database command SELECT * FROM TABLE1, at 7510, the client portion 5100 transmits a request, including the database command, to the server portion 5200. The request includes the client-schema version (e.g., SCHEMA: 0) and the client-authorization version (e.g., AUTH: 0). At 7520, the server portion 5200, transmits a response that includes a result (e.g., RESULT: [ . . . ]) of the execution of the database command. The ellipsis (i.e., " . . . ") in RESULT: [ . . . ] constitute the result of the execution of the database command, the details of which are not necessary to the understanding of this disclosure and are, therefore, omitted. The example 7000 illustrates that the server portion 5200 does not include the server-schema level or the server-authorization level in the response because neither is different from the client-schema level or the client-authorization, respectively, included in the request at 6510.

The example 7000 illustrates that at this time, the access controls of the data source are changed as shown in updated authorization state 7100. As described herein with respect to FIG. 4, the server portion 5200 may have received a notification (as a result of subscribing to, or polling for, authorization changes) of the authorization change and issued an authorization-update request. Whereas the authorization state 5300 includes that the user USER1 is authorized to access TABLE1, the updated authorization state 7100, which has or includes an updated authorization level 7120 (i.e., 1), is such that the user USER1 no longer has access to TABLE1. As such, the server-authorization level is now set to the updated authorization level 7120 (i.e., 1).

In response to user input to execute the database command SELECT * FROM TABLE1, at 7530, the client portion 5100 transmits a request, including the database command, to the server portion. The request includes the client-schema version (e.g., SCHEMA: 0) and the client-authorization version (e.g., AUTH: 0). The server portion

5200 may transmit the database command to the data source and receive a result of the database command from the data source. As the user USER1 no longer has access to TABLE1, the data source may return a NOT AUTHORIZED error status or message. At 7540, the server portion transmits a response to the client portion 5100. The response includes the error message (e.g., ERROR: NOT AUTHORIZED) and the server-authorization level (i.e., the updated authorization level 7120).

In response to determining that the server-authorization level is different from the client-authorization level, at 7550, the client portion 5100 transmits an update-tokens request (i.e., COMMAND: GET DYNAMIC TOKENS) and includes the client-schema level (i.e., SCHEMA: 0) and the client-authorization level (i.e., AUTH: 0) in the request.

At 7560, the server portion transmits a response that includes an indication of the set of tokens available at the server portion. The indication of the set of tokens can be a set of instructions for updating the set of tokens available at the client portion 5100 to match the set of tokens available at the server portion 5200. For example, the instructions include an instruction to remove (i.e., '−') the dynamic tokens TABLE1, C_ID and CNAME, which correspond to the table named TABLE1 and the column names of the table TABLE1, from the set of dynamic tokens available at the client portion 5100. As mentioned above, the instructions can have a different format or semantics. The response also includes the server-schema level (i.e., SCHEMA: 1), which the client portion 5100 can use to update the client-schema level. The response can includes the server-authorization level (i.e., AUTH: 1), which the client portion 5100 can use to update the client-authorization level.

In some situations, a database command may be long running. It is desirable to provide progress information to the user that issued the database command. In some situations, additional information (e.g., input) may be required from the user in order to perform a database command issued by the user. A database command that may not include all information required to execute the command is referred to herein as an interactive database command as additional interactions with the user may be required to obtain additional input prior to executing the command.

In one implementation, providing progress information and/or interactivity, may require a stateful server portion where the client portion continuously pings the server portion to obtain updated statuses (e.g., progress information) and the server portion may maintain a state associated with the client portion. The state may include, for example, the information already obtained from the client portion and/or the progress information already provided to the client portion.

Figure 8:
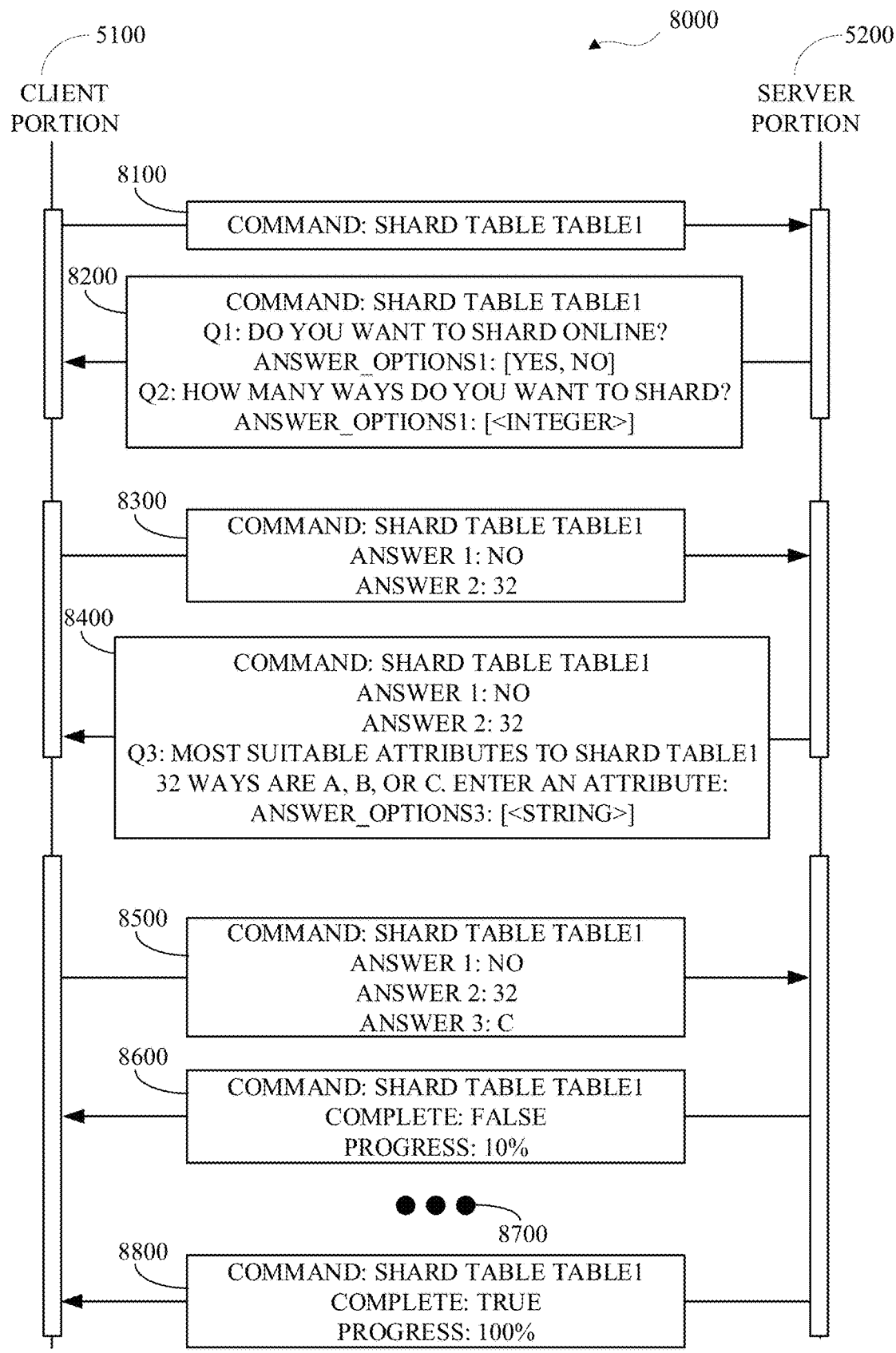
FIG. 8. is an example of an interaction diagram for an interactive, long running query.

FIG. 8. is an example 8000 of an interaction diagram for an interactive, long running query. The example 8000 includes the client portion 5100 and the server portion 5200 of FIG. 5. The example 8000 is an example of a server portion 5200 that is stateless. The interactive, long running query illustrated with respect to the example 8000 is that of sharding a table, which is a long running database command and may require additional input(s) from the user. A brief description of sharding is provided below.

The server portion 5200 may be configured to associate questionnaires with certain database commands. The server portion 5200 may be configured to transmit, to the client portion 5100, one or more questions of a questionnaire associated with a database command to obtain one or more answers from the user. The answers from the user can be used as further input to (e.g., configuration of) the database command.

In response to user input to execute the database command SHARD TABLE TABLE1, at 8100, the client portion 5100 transmits a request, including the database command, to the server portion 5200. While not specifically shown in FIG. 8, requests transmitted by the client portion 5100 and responses received from the server portion 5200 can include information as described herein, such as described with respect to FIGS. 5-7. That is, for example, the request can include the database name, the client-schema level, and the client-authorization level; and the response can include at least one of a server-schema level or a server-authentication level.

At 8200, the server portion 5200 transmits a questionnaire request that includes questions. The questionnaire request includes the database command and can include validation data that the client portion 5100 can use to validate inputs provided by the user. For example, the validation data can include possible answers to at least some of the questions. For example, the validation data can include data types, data ranges, or the like that the client portion 5100 can use to validate a response received from the user.

FIG. 8 illustrates that the questionnaire request includes two questions. The first question (i.e., DO YOU WANT TO SHARD ONLINE?) can have one of two possible answers: YES or NO. The second question (i.e., HOW MANY WAYS SHARDS DO YOU WANT TO SHARD?) requires a response that is of type INTEGER. The client portion 5100 can use these validation data to present (e.g., output, etc.) the questions to the user and validate the responses obtained. If the user does not provide a valid input to a question, the client portion can output an error message and prompt the user to provide another answer.

At 8300, the client portion 5100 re-transmits the database command along with the answers obtained in an answer response. As mentioned, the server portion 5200 does not maintain state information of the client portion 5100. As such, each request received from the client portion is treated in isolation. Thus, the client portion 8300 includes the database command and the user answers in the answer response. FIG. 8 illustrates that the user provided the answers NO and 32 to the first and second questions, respectively.

In some examples, no more input may be required from the user to execute (or attempt to execute) the database command. However, in other situations, and depending on the database command or on the answers provided by the user, additional input may be required from the user, such as illustrated herein. The server portion 5200 can continue to transmit questionnaire requests to the client portion 5100 until no more input is needed, until the user cancels the request to execute the database command, or until some other condition is met.

At 8400, the response from the server portion 5200 is another questionnaire request that includes the database command and the answers to the first and the second questions. The questionnaire request also includes a third questions (i.e., MOST SUITABLE ATTRIBUTES TO SHARD X32 ARE A, B, OR C. ENTER AN ATTRIBUTE:), where A, B, and C are names of columns of the table named TABLE1. The validation data includes that the response to the third question is to be of type STRING. In another example, the validation data may be [{A, B, C}], or some other validation data, indicating that the response can be any subset of the column names of the table TABLE1.

At 8500, the client portion 5100 re-transmits, in an answer response, the database command along with the answers previously obtained to the first and the second question and the answer (e.g., C) to the third question.

As the sharding command is a long running command, the server portion 5200 can transmit progress information to the client portion 5100. The server portion 5200 can transmit the progress information in a streaming manner. In an example, the progress information can be transmitted to the client portion 5100 at constant intervals, at the completion of each sub-step of the database command, or according to some other criterion. For example, each chunk of progress information can contain the progress of each task the data source is running. Once the execution of the database command is completed, the server portion 5200 may include information in the last chunk to indicate to the client portion 5100 that execution is completed.

As such, at 8600, the server portion 5200 transmits first progress information regarding execution of the database command. The first progress information includes that the command SHARD TABLE TABLE1 is being executed, that the execution is not yet completed (i.e., COMPLETE: FALSE), and that the execution is or is approximately 10% complete (i.e., PROGRESS: 10%). Ellipsis 8700 indicate that additional progress information may be transmitted from the server portion 5200 to the client portion 5100. At 8800, final progress information is transmitted from the server portion 5200. The final progress information includes that the progress information related to the database command SHARD TABLE TABLE1, that the execution is completed (i.e., COMPLETE: TRUE), and that the execution is 100% complete (i.e., PROGRESS: 100%).

In another example, the database command transmitted from the client portion can include more than one database command. For example, the user may provide a script (e.g., a set of database commands) to be executed. In an example, the user can provide a filename that includes the script. In an example, the user can enter the database commands as a separated list of database commands (such as separated by a semicolon or the like). Other ways of providing the script are possible. The server portion 5200 can cause the database commands of the script to be run in a serial order and a single response may be transmitted to the client portion 5100. The response can be a streaming response where each chunk additionally contains information regarding the database command to which the response chunk corresponds to and whether this is the last chunk for the database command.

Figure 9:
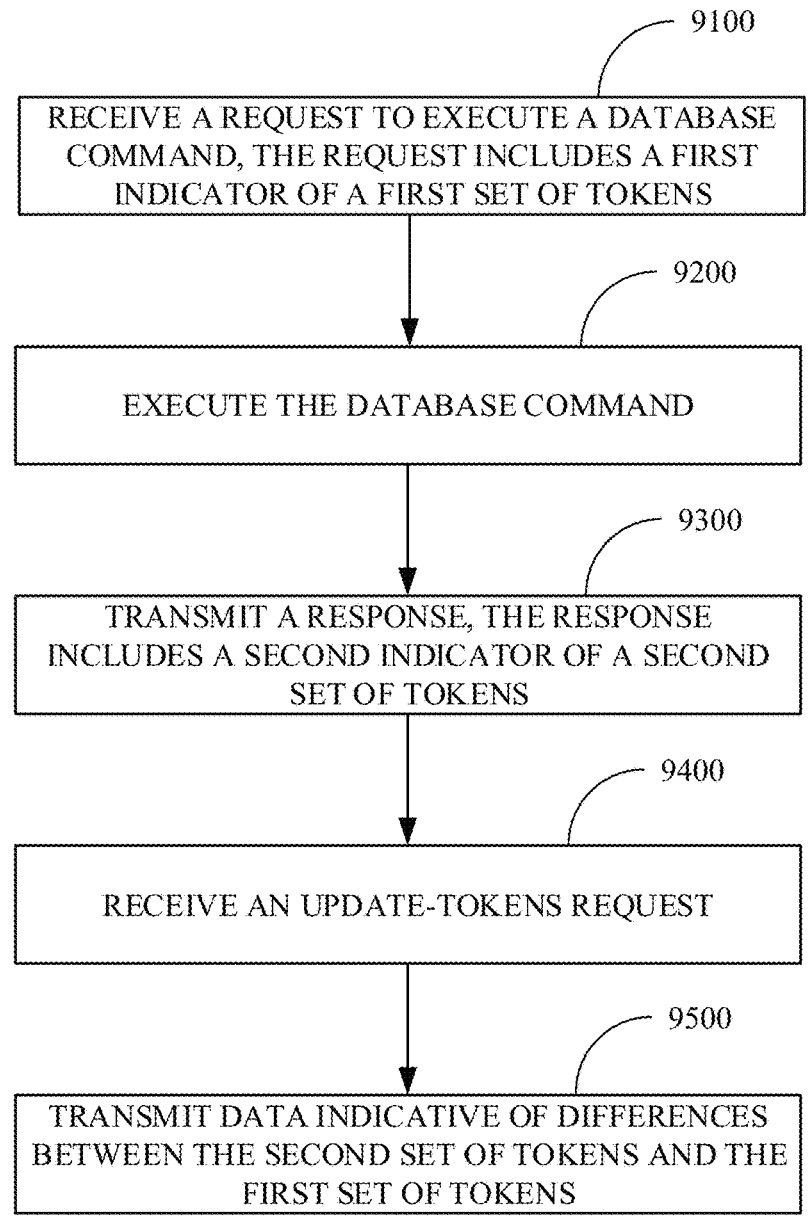
FIG. 9 is a flowchart of an example of a technique for enabling auto-completion of database commands.

FIG. 9 is a flowchart of an example of a technique 9000 for enabling auto-completion of database commands. The technique 9000 can be implemented, for example, as a software program that may be executed by computing devices such as the computing device 1000 of FIG. 1 or a database command execution device, such as the server device 4200 of FIG. 4. The software program can include machine-readable instructions that may be stored in a memory such as the static memory 1200, low-latency memory 1300, or some other non-transitory computer-readable storage medium, and that, when executed by a processor, such as processor 1100, may cause the computing device to perform the technique 9000. The technique 9000 may be implemented in whole or in part by the server portion 4300 of FIG. 4. The technique 9000 can be implemented using specialized hardware or firmware. Multiple processors, memories, or both, may be used.

At 9100, the technique 9000 receives a request to execute a database command. The request may be received at the database command execution device from a client device, which can be the client device 4100 of FIG. 4. The request can include a first indicator of a first set of tokens of the database that is available at the client device. At 9200, the technique 9000 executes the database command. Executing the database command can mean actually performing the database command by a data source of the server device, which may be clustered server device. Executing the database command can mean forwarding the database command to an external data source that can execute the database command.

At 9300, the technique 9000 transmits a response to the request. The response can be transmitted from the database command execution device to the client device. As described above, the response includes a second indicator of a second set of tokens of the database that is different from the first set of tokens. The response can also include a status (which can include results) of the execution of the database command. The data source may transmit the status to the database command execution device.

At 9400, the technique 9000 receives an update-tokens request, which can be as described above. The update-tokens request can be received at the database command execution device from the client device. As described above, the update-tokens request can include the first indicator. At 9500, the technique 9000 transmits from the database command execution device to the client device, data indicative of differences between the second set of tokens and the first set of tokens, as described above.

In an example, and as described above, the first indicator can indicate a first schema level of the database (e.g., a client-schema level). The second indicator indicates a second schema level of the database that is different from the first schema level (e.g., a server-schema level).

In an example, the technique 9000 can further include receiving, at the database command execution device, a notification of a schema change of the database. Responsive to the notification of the schema change, and such as described at least with respect to FIG. 4, the technique 9000 can transmit a schema-update request to receive schema changes, receive the schema changes, and update a schema level from the first schema level to the second schema level. In an example, the notification of the schema change can be received responsive to the database command execution device polling the data source for the schema change. In an example, the notification of the schema change can be received responsive to the database command execution device subscribing to receive notifications of the schema change.

In an example, and as described above, the first indicator can indicate a first authorization level (e.g., a client-authorization level) to the database of a user providing the database command and the second indicator indicates a second authorization level (e.g., a server-authorization level) to the database of the user such that the second indicator is different from the first indicator. In an example, the status of the execution of the database command can indicate an authorization failure. In an example, the status of the execution of the database command can indicate successful execution or execution failure of the database command and the response can further include a result of the execution of the database command.

In an example, the technique 9000 can further include transmitting, to the client device and prior to executing the database command, a first questionnaire request for inputs, as described at least with respect to FIG. 8. The first questionnaire request can include a first question and first validation data. The technique 9000 can further include transmitting, to the client device and prior to executing the database command, a second questionnaire request for additional inputs. The second questionnaire request can include a second question, second validation data, an answer to the first question, and the database command.

Figure 10:
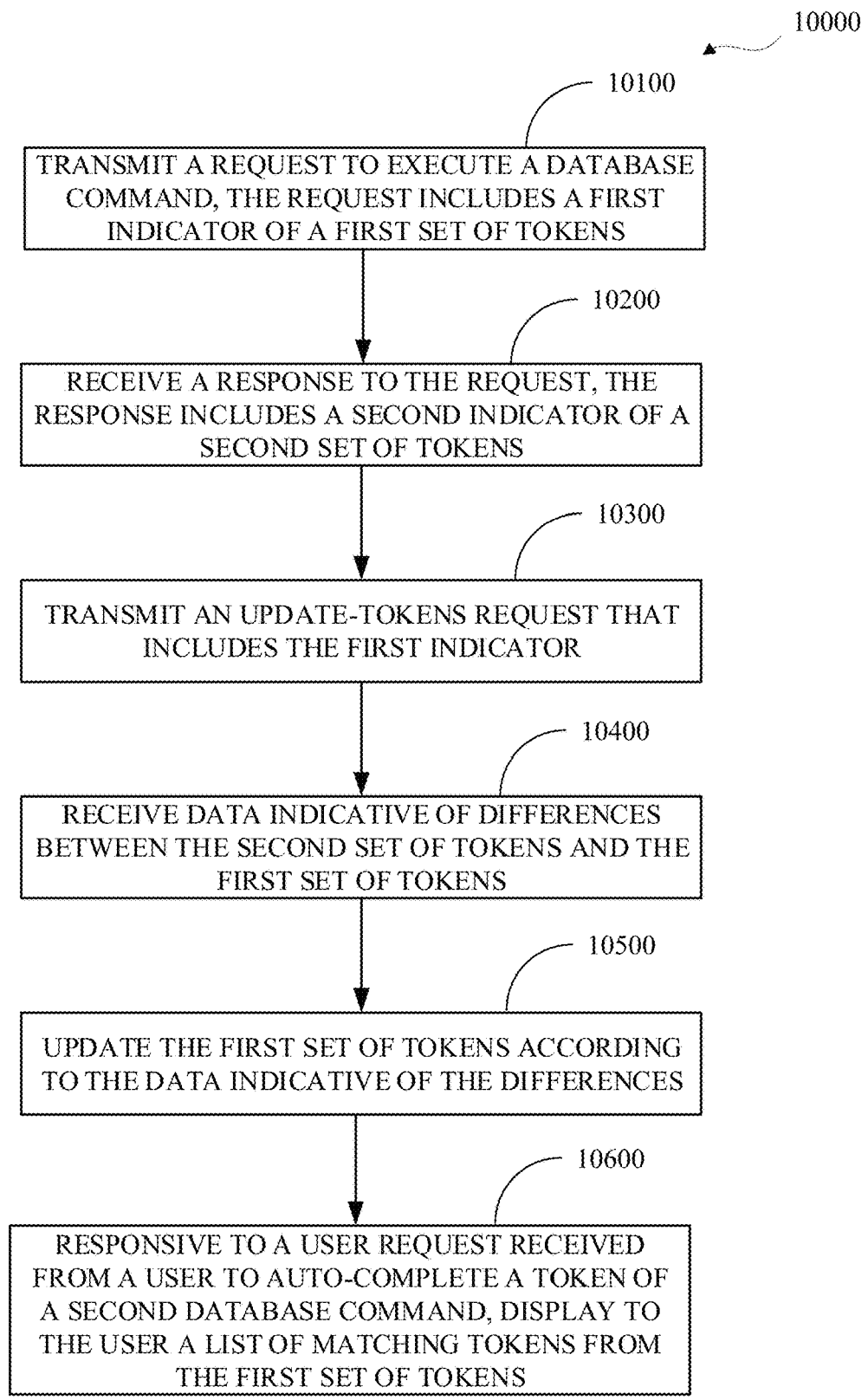
FIG. 10 is a flowchart of an example of a technique for providing auto-completion of database commands.

FIG. 10 is a flowchart of an example of a technique 10000 for providing auto-completion of database commands. The technique 10000 can be implemented, for example, as a software program that may be executed by computing devices such as the computing device 1000 of FIG. 1 or a client device, such as the client device 4100 of FIG. 4. The software program can include machine-readable instructions that may be stored in a memory such as the static memory 1200, low-latency memory 1300, or some other non-transitory computer-readable storage medium, and that, when executed by a processor, such as processor 1100, may cause the computing device to perform the technique 10000. The technique 10000 may be implemented in whole or in part by the client portion 4120 of FIG. 4. The technique 10000 can be implemented using specialized hardware or firmware. Multiple processors, memories, or both, may be used.

At 10100, the technique 10000 transmits a request to execute a database command. The request includes a first indicator of a first set of tokens of the database that is available at the device. The request can be transmitted to a database command execution device, such as the server device 4200. The database command execution device can itself (or a data source therein) execute the database command or can transmit the database command to an external data source for execution.

At 10200, the technique 10000 receives, from the database command execution device, a response to the request. The response includes a second indicator of a second set of tokens of the database that is different from the first set of tokens. The response can also include a status of executing the database command. The second indicator of a the second set of tokens is such that it is different from the first set of tokens.

In an example, the first indicator can be or can be as described with respect to the client-schema level and the second indicator can or can be as described with respect to the server-schema level. In an example, the first indicator can be or can be as described with respect to the client-authorization level and the second indicator can be or can be as described with respect to the server-authorization level. As such, the first indicator can indicate a first authorization level to the database (or a portion thereof) of the user providing the database command and the second indicator can indicate a second authorization level to the database of the user.

Responsive to the second indicator being different from the first indicator, at 10300, the technique 10000 transmits, to the database command execution device, an update-tokens request that includes the first indicator. The update-tokens request can be as described above. At 10400, the technique 10000 receives, from the database command execution device, data indicative of differences between the second set of tokens and the first set of tokens. The data indicative of differences between the second set of tokens and the first set of tokens can be as described at least with respect to 5520 and 5570 of FIG. 5, 6560 of FIG. 6, or 7560 of FIG. 7.

At 10500, the technique 10000 updates, as described above, the first set of tokens according to the data indicative of the differences between the second set of tokens and the first set of tokens. At 10600, responsive to a user request received from a user to auto-complete a token of a second database command, the technique 10000 displays to the user a list of matching tokens from the first set of tokens.

In an example, the technique 10000 can further include regularly transmitting, to the database command execution device, the update-tokens request. In an example, and as described above, the technique 10000 can further include receiving, from the database command execution device, a questionnaire that includes a question and validation data; obtaining an answer to the question from the user; validating the answer using the validation data; and transmitting an answer response to the database command execution device, where the answer response can include the database command and the answer. In an example, the database command can be a long running command and the technique 10000 can further include receiving progress information regarding execution of the database command.

Another aspect of the disclosed implementation is a technique for providing (e.g., implementing, etc.) a schema-aware database interface that can be or can be implemented, at least partially, by the client portion 4120 of FIG. 4. The technique can be implemented by a client device, such as the client device 4100 that includes a processor and a memory. The memory can include instructions configured to perform the technique.

The technique can include generating a first database command based on first user input obtained using a first token set representative of at least a portion of a database schema. The first token set can be restricted, at the time the client device obtained the first token set, to tokens for which a user of the client device is authorized to access and that are associated with a first schema level. The technique also includes receiving, responsive to sending the first database command to a server, (a) a result from executing the first database command and (b) a server-schema level representative of a current state of the database schema. The technique also includes, responsive to a determination that the server-schema level is newer than the client-schema level, obtaining, from the server, update to the first token set to obtain an updated first token set. The technique then uses the updated first token set to obtain a second user input. For example, the updated first token set can be used to provide auto-completion of tokens, as described herein.

The technique can further include transmitting, to the server, and based on the second user input, a second database command; receiving, responsive to transmitting the second database command, a questionnaire that includes a question and validation data. An answer to the question can be obtained from the user. The answer can be validated using the validation data. If the answer does not satisfy (e.g., meet, etc.) the validation data, an error message can be provided to the user and the user can be re-prompted, such as until the user provides a valid answer, to provide the answer. An answer response can be transmitted to the server, where the answer response includes the second database command and the answer.

The technique can further include establishing a user session with the server and receiving static tokens corresponding to keywords of a grammar for the database commands. The second user input can be further obtained using the static tokens.

A brief description of sharding is now provided. In a distributed database, such as a distributed in-memory database as described herein, a table may be partitioned into shards. The data of the sharded table can be low-latency data as described herein. Sharding a table includes distributing the data (e.g., rows) of the sharded table amongst the shards in such a way that a row of the sharded table is included in a shard and is omitted from the other shards. Sharding a table may include distributing the rows of the table amongst the shards according to sharding criteria. Sharding a table may include distributing the rows of the table to respective shards based on the value in the row for a column identified by the sharding criteria. For examples, rows of a sharded table having a first value for the column identified by the sharding criteria may be included in a first shard and omitted from a second shard and rows of the sharded table having a second value for the column may be included in the second shard and omitted from the first shard.

The sharding criteria can be derived from one or more columns of the table. The sharding criteria can be derived from one column of the sharded table, can use more than one column of the table, or can be some other criteria. The sharding criteria may be used to distribute rows of the table amongst the available shards. This may include arranging the distribution of the rows in a manner such that rows with the same sharding criteria value(s) are placed in the same shard where feasible based on the number of shards and the variation in the number of rows per shard that is desired. In some implementations, all the rows of the table that have the same sharding criteria value(s) may be stored in only one of the shards. A shard can include more than one value of the sharding criteria.

A table can be sharded into tens, hundreds, or more shards. A shard can include, for example, zero rows or millions of rows of data. The shards can be distributed to database instances of the distributed database, such as the in-memory database instances described herein. In an example, the number of shards can be a multiple of the number of database instances. As such, more than one shard can be distributed to a database instance. The database instances may be implemented on various different computing devices. Some database instances may be implemented on the same computing device.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "determine," "identify," "obtain," and "form" or any variations thereof, includes selecting, ascertaining, computing, looking up, receiving, determining, establishing, obtaining, or otherwise identifying or determining in any manner whatsoever using one or more of the devices and methods shown and described herein.

As used herein, the term "computing device" includes any unit, or combination of units, capable of performing any method, or any portion or portions thereof, disclosed herein.

As used herein, the terminology "example," "embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more computer readable mediums having computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Attributes may comprise any data characteristic, category, content, etc. that in one example may be non-quantifiable or non-numeric. Measures may comprise quantifiable numeric values such as sizes, amounts, degrees, etc. For example, a first column containing the names of states may be considered an attribute column and a second column containing the numbers of orders received for the different states may be considered a measure column.

Aspects of the present embodiments are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a computer, such as a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for enabling auto-completion of database commands, comprising:
receiving, at a database command execution device and from a client device, a request to execute a database command, wherein the request includes the database command and a first indicator of a first set of tokens of the database that is available at the client device, wherein the first set of tokens comprises names of tables and names of columns of the database, wherein the database command includes tokens from the first set of tokens, and wherein the first indicator comprises at least one of a first authorization level to the database of a user providing the database command or a first schema level of the database;

executing the database command;

transmitting, from the database command execution device and to the client device, a response to the request, wherein the response includes a second indicator of a second set of tokens of the database that is different from the first set of tokens;

receiving, at the database command execution device and from the client device, an update-tokens request that includes the first indicator; and transmitting, from the database command execution device and to the client device, data indicative of differences between the second set of tokens and the first set of tokens.

2. The method of claim 1, wherein the first indicator indicates the first schema level of the database, and wherein the second indicator indicates a second schema level of the database that is different from the first schema level.

3. The method of claim 2, further comprising:

receiving, at the database command execution device, a notification of a schema change of the database;

responsive to the notification of the schema change:
transmitting a schema-update request to receive schema changes;
receiving the schema changes; and
updating, at the database command execution device, a schema level from the first schema level to the second schema level.

4. The method of claim 3, wherein the notification of the schema change is received responsive to the database command execution device polling for the schema change.

5. The method of claim 3, wherein the notification of the schema change is received responsive to the database command execution device subscribing to receive notifications of the schema change.

6. The method of claim 1, wherein the first indicator indicates the first authorization level to the database of the user providing the database command, wherein the second indicator indicates a second authorization level to the database of the user, and wherein the second indicator is different from the first indicator.

7. The method of claim 6, wherein the response further includes a status of execution of the database command indicating an authorization failure.

8. The method of claim 6, wherein the response further includes a status of execution of the database command indicating a successful execution or an execution failure of the database command, and wherein the response further includes a result of the execution of the database command.

9. The method of claim 1, further comprising:

transmitting, to the client device and prior to executing the database command, a first request for inputs, wherein the request comprises a first question and first validation data.

10. The method of claim 9, further comprising:

transmitting, to the client device and prior to executing the database command, a questionnaire request for additional inputs, wherein the questionnaire request comprises a second question, second validation data, an answer to the first question, and the database command.

11. The method of claim 1, wherein the client device is configured to use the data indicative of the differences between the second set of tokens and the first set of tokens to update the first set of tokens and use the updated first set of tokens to provide auto-completion of user input.

12. A device for providing auto-completion of database commands, comprising:

a memory; and a processor, the processor configured to execute instructions stored in the memory to:

transmit, to a database command execution device, a request to execute a database command, wherein the request includes a first indicator of a first set of tokens of the database that is available at the device, wherein the first set of tokens comprises names of tables and names of columns of the database, and wherein the first indicator comprises at least one of a first authorization level to the database of a user providing the database command or a first schema level of the database;

receive, from the database command execution device, a response to the request, wherein the response includes a second indicator of a second set of tokens of the database that is different from the first set of tokens;

responsive to the second indicator, transmit, to the database command execution device, an update-tokens request that includes the first indicator;

receive, from the database command execution device, data indicative of differences between the second set of tokens and the first set of tokens;

update the first set of tokens according to the data indicative of differences between the second set of tokens and the first set of tokens to obtain an updated first set of tokens; and responsive to a user request received from the user to auto-complete a partial token of a second database command, display to the user a list of tokens that match the partial token from the updated first set of tokens.

13. The device of claim 12, wherein the first indicator indicates the first schema level of the database, and wherein the second indicator indicates a second schema level of the database that is different from the first schema level.

14. The device of claim 12, wherein the first indicator indicates the first authorization level to the database of the user providing the database command, wherein the second indicator indicates a second authorization level to the database of the user, and wherein the second indicator is different from the first indicator.

15. The device of claim 12, wherein the processor is further configured to:

regularly transmit, to the database command execution device, the update-tokens request.

16. The device of claim 12, wherein the processor is further configured to:

receive, from the database command execution device, a questionnaire comprising a question and validation data;

obtain an answer to the question from the user;
validate the answer using the validation data; and
transmit an answer response to the database command execution device, wherein the answer response comprises the database command and the answer.

17. The device of claim 12, wherein the processor is further configured to:
receive progress information regarding execution of the database command.

18. A device comprising:
a processor; and
a memory, the processor configured to execute instructions stored in the memory to:
generate a first database command based on first user input obtained from a user using a first token set representative of at least a portion of a database schema, wherein the first token set is restricted to tokens for which the user is authorized to access and associated with a first version;
receive, responsive to sending the first database command to a server, (a) a result from executing the first database command and (b) a current version representative of a current state of the database schema;
responsive to a determination that the current version is newer than the first version, obtain, from the server, update to the first token set to obtain an updated first token set; and
obtain second user input using the updated first token set, wherein to obtain the second user input using the updated first token set comprises:
responsive to a user request received from the user to auto-complete a partial token of a second database command, display to the user a list of tokens that match the partial token from the updated first token set.

19. The device of claim 18, wherein the instructions further comprise instructions to:
transmit, to the server, and based on the second user input, a second database command;
receive, responsive to transmitting the second database command, a questionnaire comprising a question and validation data;
obtain an answer to the question from the user;
validate the answer using the validation data; and
transmit an answer response to the server, wherein the answer response comprises the second database command and the answer.

20. The device of claim 19, wherein the instructions further comprise instructions to:
establish a user session with the server; and
receive static tokens corresponding to keywords of a grammar for the database commands, wherein the second user input is further obtained using the static tokens.

\* \* \* \* \*